United States Patent
Sen

(10) Patent No.: US 11,222,370 B2
(45) Date of Patent: *Jan. 11, 2022

(54) METHOD AND SYSTEM FOR DYNAMIC PARKING SELECTION, TRANSACTION, MANAGEMENT AND DATA PROVISION

(71) Applicant: SPACES OPERATIONS, LLC, New York, NY (US)

(72) Inventor: Sourabh Sen, New York, NY (US)

(73) Assignee: SPACES OPERATIONS, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/156,889

(22) Filed: Jan. 25, 2021

(65) Prior Publication Data

US 2021/0256577 A1    Aug. 19, 2021

Related U.S. Application Data

(63) Continuation of application No. 15/247,459, filed on Aug. 25, 2016, now Pat. No. 10,902,485.

(Continued)

(51) Int. Cl.
*G06Q 30/02* (2012.01)
*G08G 1/017* (2006.01)
(Continued)

(52) U.S. Cl.
CPC ......... *G06Q 30/0284* (2013.01); *G06Q 10/02* (2013.01); *G06Q 20/20* (2013.01);
(Continued)

(58) Field of Classification Search
CPC ............... G06Q 2240/00; G06Q 20/20; G06Q 20/3224; G06Q 10/02; G06Q 30/0284;
(Continued)

(56) References Cited

U.S. PATENT DOCUMENTS 5,432,508 A    7/1995  Jackson
6,340,935 B1   1/2002  Hall
(Continued)

FOREIGN PATENT DOCUMENTS

CN    112017363 A  * 12/2020
WO    2014/157781 A1   10/2014

OTHER PUBLICATIONS

"Optimization Methods for Intelligent Transportation Systems in Urban Settings," by Yanfeng Geng, Boston University College of Engineering, 2013 (Year: 2013).*

(Continued)

*Primary Examiner* — George Chen
*Assistant Examiner* — Brian Adams Heflin
(74) *Attorney, Agent, or Firm* — Banner & Witcoff, Ltd.

(57) ABSTRACT

A parking garage system includes a plurality of parking garages. Each parking garage has a plurality of parking sectors and each parking sector has a plurality of parking spaces. A digital system tracks an occupancy level of each parking sector and an anticipated departure time of vehicles parked in each parking space. The digital system further directs vehicles to a particular parking sector based on the driver's anticipated departure time. The digital system also advises potential customers of occupancy level and parking rates and communicates information regarding occupancy level and parking rates to other parking garages.

20 Claims, 26 Drawing Sheets

Related U.S. Application Data

(60) Provisional application No. 62/210,055, filed on Aug. 26, 2015.

(51) Int. Cl.

| | | |
|---|---|---|
| *G06Q 20/32* | (2012.01) | |
| *G08G 1/14* | (2006.01) | |
| *G06Q 20/20* | (2012.01) | |
| *G06Q 10/02* | (2012.01) | |
| *G08G 1/065* | (2006.01) | |

(52) U.S. Cl.
CPC ......... *G06Q 20/3224* (2013.01); *G08G 1/017* (2013.01); *G08G 1/0175* (2013.01); *G08G 1/065* (2013.01); *G08G 1/144* (2013.01); *G08G 1/148* (2013.01); *G06Q 2240/00* (2013.01)

(58) Field of Classification Search
CPC ........ G08F 1/065; G08F 1/017; G08F 1/0175; G08F 1/144; G08F 1/148
USPC .......................................................... 705/5
See application file for complete search history.

(56) References Cited

U.S. PATENT DOCUMENTS

| | | | |
|---|---|---|---|
| 7,181,426 B2 | 2/2007 | Dutta | |
| 7,533,809 B1 | 5/2009 | Robinson et al. | |
| 7,538,690 B1 | 5/2009 | Kaplan et al. | |
| 9,602,193 B1 | 3/2017 | Mendelson | |
| 9,734,710 B2 * | 8/2017 | Kang ........................ | G08G 1/07 |
| 10,169,995 B2 * | 1/2019 | Bostick .................. | G08G 1/144 |
| 2002/0008639 A1 | 1/2002 | Dee | |
| 2004/0068433 A1 | 4/2004 | Chatterjee et al. | |
| 2005/0165682 A1 | 7/2005 | Duke | |
| 2006/0212344 A1 | 9/2006 | Marcus et al. | |
| 2008/0027793 A1 | 1/2008 | Taylor | |
| 2008/0136674 A1 | 6/2008 | Jang et al. | |
| 2009/0204319 A1 | 8/2009 | Shanbhag et al. | |
| 2010/0145811 A1 | 6/2010 | Burdick | |
| 2011/0022427 A1 | 1/2011 | Dayan | |
| 2012/0245966 A1 | 9/2012 | Volz | |
| 2012/0274482 A1 | 11/2012 | Chen et al. | |
| 2012/0299749 A1 | 11/2012 | Xiao et al. | |
| 2012/0310712 A1 | 12/2012 | Baughman et al. | |
| 2012/0323643 A1 | 12/2012 | Volz | |
| 2013/0176147 A1 | 7/2013 | Anderson et al. | |
| 2014/0189814 A1 | 7/2014 | Marten et al. | |
| 2014/0285361 A1 * | 9/2014 | Tippelhofer ........... | G08G 1/143 340/932.2 |
| 2014/0292482 A1 | 10/2014 | Robertson et al. | |
| 2014/0309789 A1 | 10/2014 | Ricci | |
| 2015/0049914 A1 | 2/2015 | Alves | |
| 2015/0066545 A1 | 3/2015 | Kotecha et al. | |
| 2015/0123818 A1 | 5/2015 | Sellschopp | |
| 2016/0117866 A1 | 4/2016 | Stancato et al. | |
| 2016/0133134 A1 | 5/2016 | Todasco et al. | |
| 2016/0189324 A1 | 6/2016 | Eramian et al. | |
| 2018/0218605 A1 * | 8/2018 | Mowatt .............. | G06Q 30/0284 |

OTHER PUBLICATIONS

"Tired of Driving in Circles? Check out These Parking Apps," Vehicle-Technology & Trends, Sep. 5, 2014 (Year: 2014).*

Oct. 31, 2016—(WO) International Search Report—App PCT/US16/48828.

Aug. 24, 2018 (US) Non-Final Office Action—U.S. Appl. No. 15/247,459.

Jun. 6, 2019 (US) Final Office Action—U.S. Appl. No. 15/247,459.

Mar. 27, 2020 (US) Non-Final Office Action—U.S. Appl. No. 15/247,459.

Sep. 14, 2020 (US) Notice of Allowance and Fees Due—U.S. Appl. No. 15/247,459.

Geng, Yangeng, "Optimization Methods for Intelligent Transportation Systems in Urban Settings," Boston University, College of Engineering Dissertation, 2013, 182 pages.

* cited by examiner

METHOD AND SYSTEM FOR DYNAMIC PARKING SELECTION, TRANSACTION, MANAGEMENT AND DATA PROVISION

CROSS-REFERENCE TO RELATED APPLICATIONS

This application is a continuation application of U.S. application Ser. No. 15/247,459 filed Aug. 25, 2016, which claims the benefit of U.S. Provisional No. 62/210,055, filed Aug. 26, 2015, which is incorporated herein by reference in their entirety.

FIELD OF THE DISCLOSURE

Disclosed is an operational and analytical system for garages paired with a consumer-facing mobile device and computer implemented system and method for initiating and completing the processing of a transaction for one or multiple parking sessions. Garages conduct their full parking operation in a cloud-based automated system of executing and managing parking transactions, including rate determination, dynamic vehicle spot assignments and task management. The fully integrated system transmits updated pricing and availability information from garages to users, and user parking information to garages. The consumer, in real time, searches for, selects, reserves and pays for parking spots using underlying algorithms and data to facilitate the process. The underlying algorithms allow for a garage selection based on location, pricing and real-time availability using a three click system. The method comprises storing an identifier for each user/vehicle combination, and transmitting that identifier to a network server. The method further comprises an integrated platform for parking garages to gather real time information on demand and capacity as an operations and business strategy tool for garage management. The method further comprises using integrated targeted advertising to enable businesses to disseminate information to users.

BACKGROUND OF THE DISCLOSURE

Transparency of price and availability for parking, particularly off street parking, has been a challenge for Users given the off-line nature of parking rates and inventory. Parking transactions remain inefficient. The general lack of real-time connection to parking company operational systems makes information outdated and inaccurate, even with the advent of recent User-facing parking applications. Besides not being able to easily determine prices before selecting a parking spot, once parked, Users have virtually no direct visibility into what their final cost will be—if they pick up their car early, stay later, etc.

There have been attempts to automate parking facility management. For example, U.S. Pat. No. 5,091,727, "Fully Optimized Automatic Parking Facility Management," to Mahmmod discloses an automated parking facility management system that determines when a vehicle is at a facility entrance, stores the locations of vacated facility parking spots and determines the locations of desirable vacated parking spots. However, for the most part, parking companies generally manage their businesses with antiquated systems and limited data such that they are unable to optimize the demand, inventory and pricing equation. Currently, neither the parking companies nor the User benefit from this inefficiency. Parking companies cannot effectively adjust pricing in real-time to optimize revenue, and Users cannot be presented with real time offers to stimulate demand. U.S. Pat. No. 5,091,727 is incorporated by reference herein in its entirety.

Lastly, targeted advertising is highly ineffective given lack of true understanding of intended User behavior.

In short, there is a lack of accurate data and information in the parking industry, for all actors, even with the advent of recent User-facing garage Applications.

BRIEF SUMMARY

Disclosed herein is a parking garage system that includes a plurality of parking garages. Each parking garage has a plurality of parking sectors and each parking sector has a plurality of parking spaces. A digital system tracks an occupancy level of each parking sector and an anticipated departure time of vehicles parked in each parking space. The digital system further directs vehicles to a particular parking sector based on the driver's anticipated departure time. The digital system also advises potential customers of occupancy level and parking rates and communicates information regarding occupancy level and parking rates to other parking garages.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
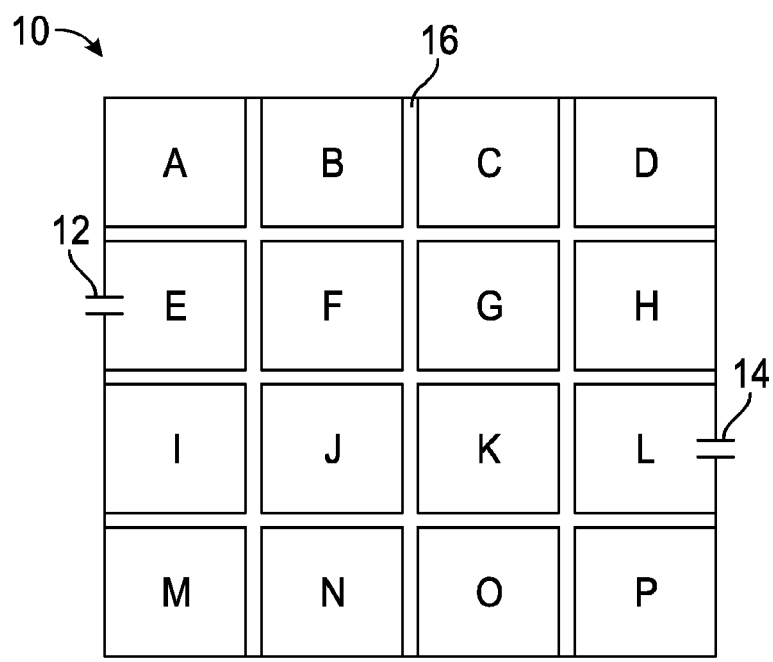
FIG. 1 depicts one floor of a parking garage as disclosed herein.

FIG. 1 depicts one floor 10 of a commercial parking garage, recognizing that most commercial parking garages have multiple floors connected by ramps and/or elevators. There are one or more entrances/exits 12, 14 providing access between the garage and adjacent city streets, if on the ground floor or providing access to ramps if on a floor above or below ground level. The floor 10 is divided into a plurality of parking sectors (A-P in FIG. 1) that each contain a plurality of parking spaces. Internal roadways 16 enable vehicles being parked to be driven to a desired parking sector. One factor customers consider when selecting a parking garage is efficiency in delivering a car when the customer is ready to leave. The higher the efficiency, the more likely a customer is to return to that garage. Accordingly, cars belonging to customers expected to request their car soon are parked close to a garage entrance/exit 12/14, for example, in sector E or F. Cars expected to remain in the garage for a more extended period of time are parked in sectors more remote from the garage entrance/exit, for example, in sector C or N. During the business day, cars are moved between sectors in anticipation of customer demand to increase garage efficiency.

Figure 2:
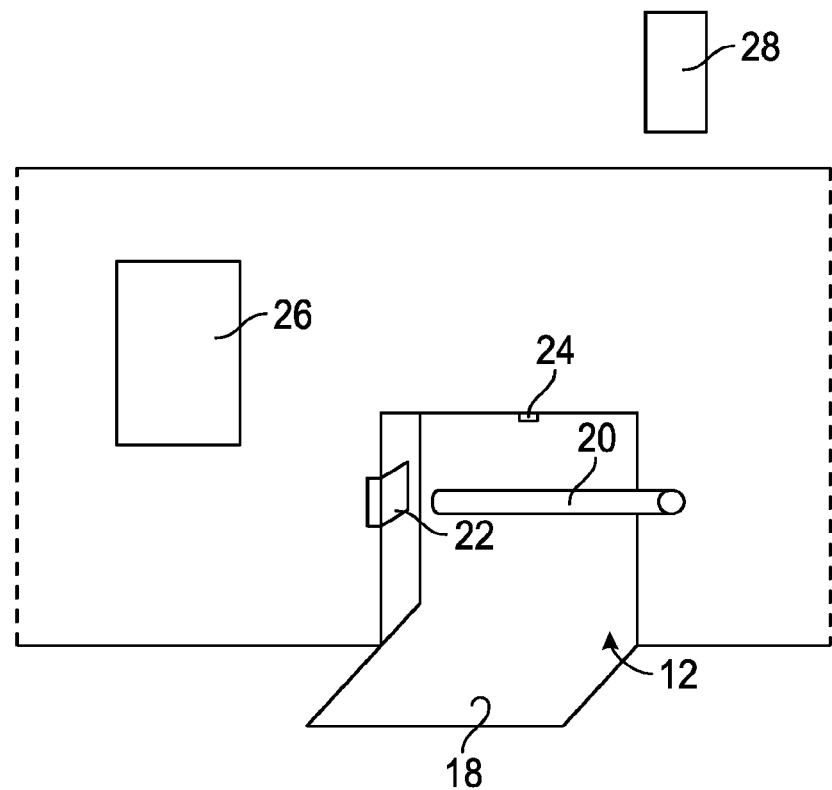
FIG. 2 depicts an entrance to the parking garage as disclosed herein.

FIG. 2 depicts a garage entrance/exit 12 with access 18 to a city street. Typical features associated with the entrance/exit 12 are a pivoting gate 20 to control the ingress and egress of vehicles, a camera 22 to record the entrance and exit of vehicles and to document damage to the body of those vehicles, a detector 24 such as a bar code scanner or a radio frequency identification (RFID) scanner that identifies cars entering or leaving the garage, and a display board 26 that provides information to potential customers, such as price and availability of parking spaces.

Alternatively, detector 24 can be a beacon device which emits a signal to the phone application, letting the application know that the customer is in that particular garage, passing the garage information to the application to allow it to check-in/out the customer. Other garages may be "open" lots, either allowing self-paring or requiring an attendant to take the car at the entrance and park it within the facility. A server 28, typically located elsewhere in the garage, such as in an office, communicates with the features and with other garages to enhance parking efficiency. Communication is via a digital network and may include wired or wireless communication as known in the art.

In accordance with the invention, the beacon may emit a unique, one way signal. The one way signal may be transmitted via any suitable form, such as Bluetooth, near field communication, or RFID. In one embodiment, the mobile application detects a strength of the signal emitted from the beacon. Upon detecting that the signal strength has satisfied a predetermined signal strength threshold, an indication is provided that the user, and the associated mobile application, are within a desired range of the beacon.

The beacon may further include in the signal transmission an identification signal that identifies a specified parking garage associated with the specific beacon. In accordance with this feature, a user may access the mobile application via their device, and the mobile application may identify the entered garage. This allows the check-in, check-out and payment functions for the specific garage to be enabled.

Figure 15:
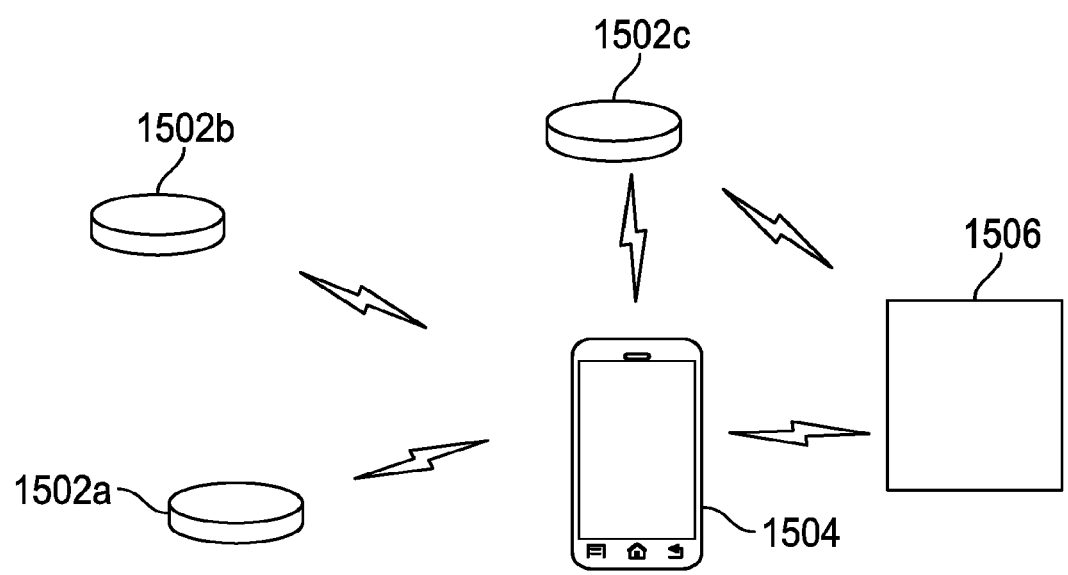
FIG. 15 illustrates a beacon device in accordance with the invention.

As illustrated in FIG. 15, detector 24 may be one or more of beacons 1502a, 1502b, and 1502c, which may transmit signals to a device, such as mobile device 1504. Beacons 1502a, 1502b, and 1502c may be located within a parking garage. Some or all of the beacons may be located internal to the parking and/or external to the garage, such as at an entrance. One or more of the beacons may also, or alternatively, transmit a signal directly to an offsite server, such as server 1506.

Figure 3:
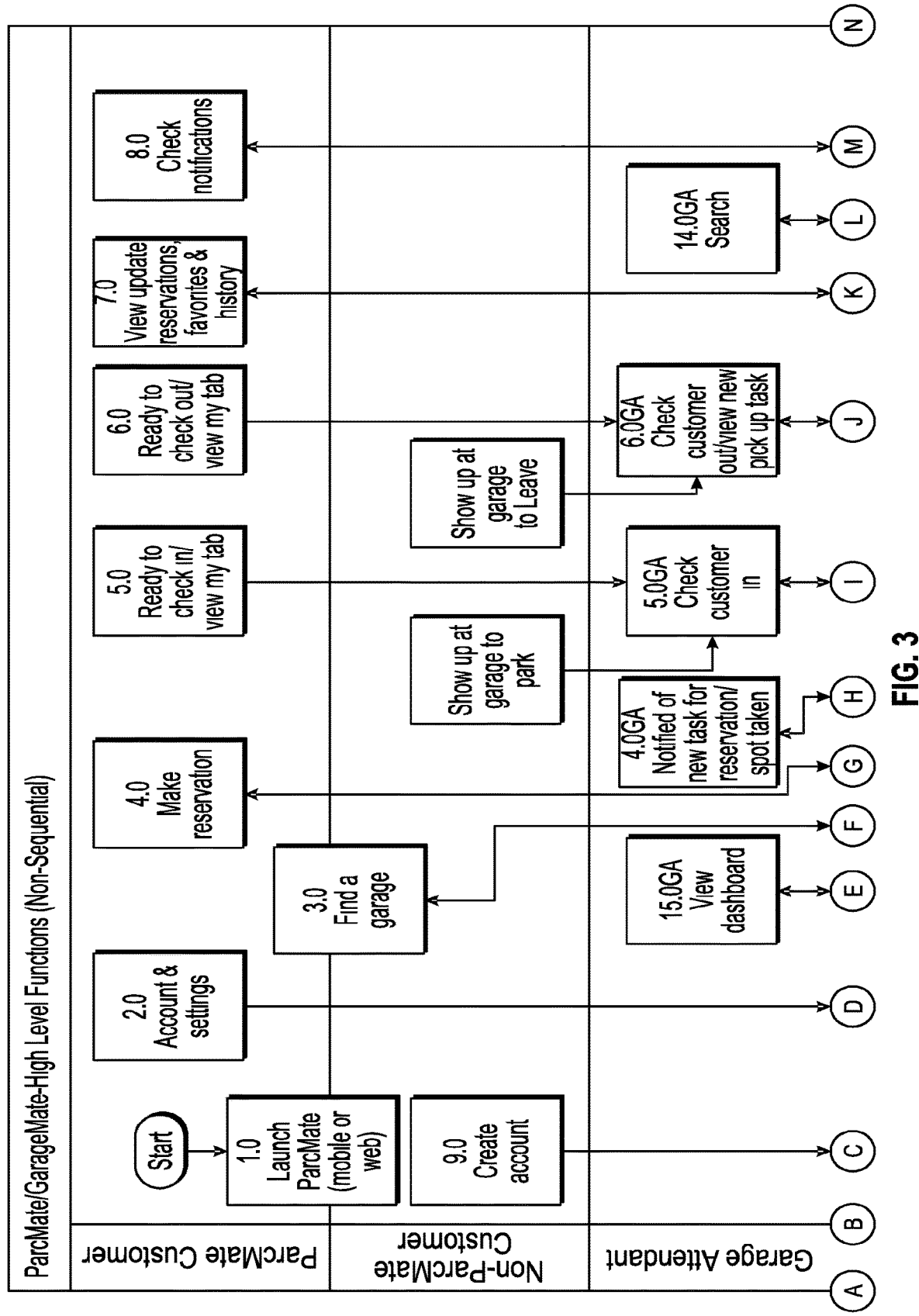
FIG. 3 is a flow chart depiction of functions involved with parking a vehicle at the parking garage
Figure 3:
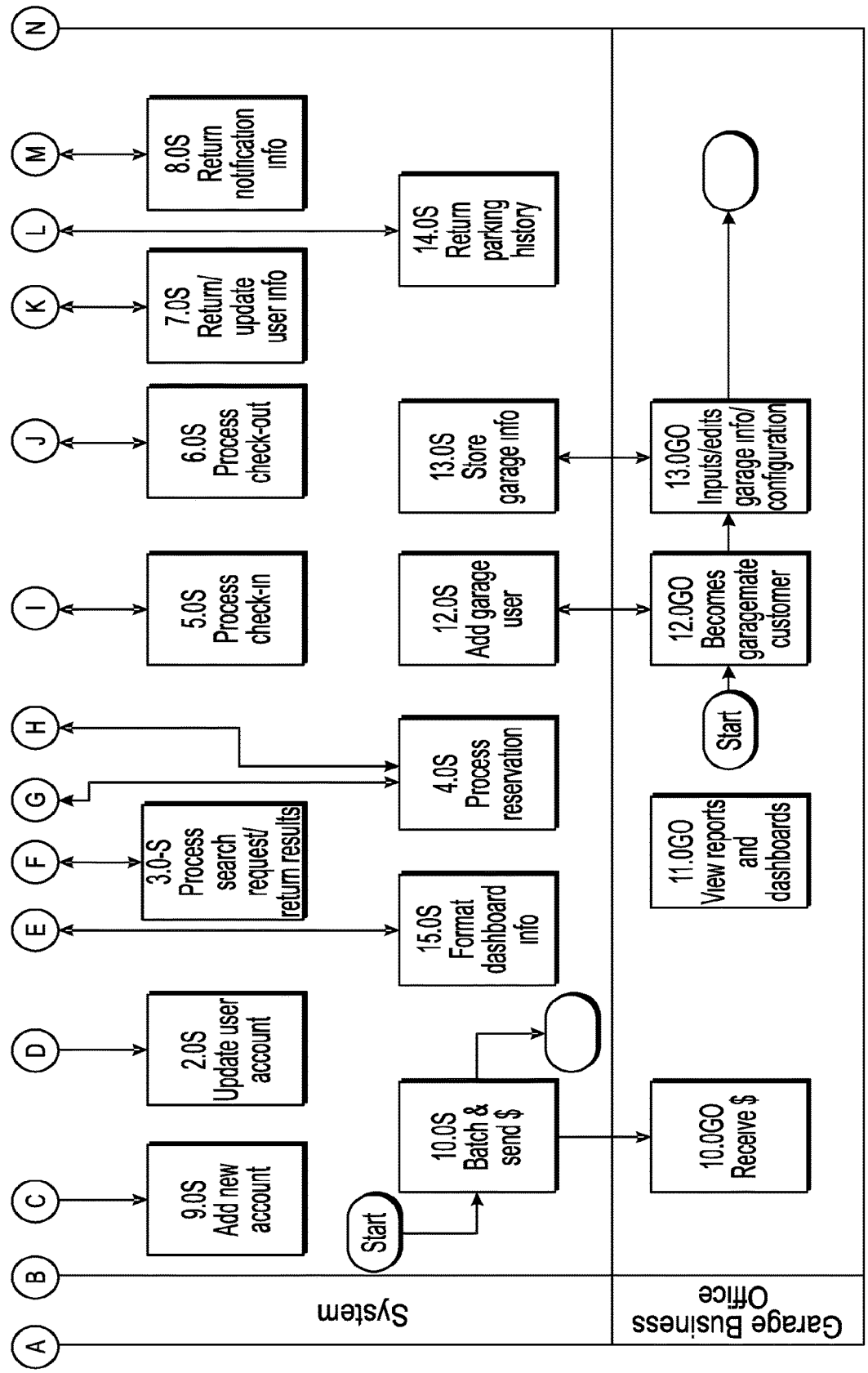

FIG. 3 is a flow chart depiction of functions involved with parking a vehicle at the garage described herein. The functions are described in more detail below. To enable a customer to digitally interact with the garage, a digital account 9.0 is created. A customer having such a digital account 9.0 is referred to herein as a "ParcMate Customer" while a customer lacking such a digital account is referred to herein as a "Non-ParcMate Customer." Information about a customer is contained within Account & Settings and provides information about the customer such as preferences and payment information to expedite the parking process.

Finding a garage 3.0 is based on a number of curated options, including best, closest and cheapest. As described below, global positioning is employed with the customer's intended destination and preferences to select the garage best suited for that customer. ParcMate Customers may reserve a spot 4.0 prior to arrival and take care of most check-in 5.0 upon arrival and most of check-out 6.0 upon departure.

By utilizing global positioning-based tracking, the inventive application can determine the precise location of the user. The application determines the user's GPS location, accesses a database of garages, calculates a distance of user location from garages, based on stored latitude and longitude. Additionally, the Haversine formula may be used to determine precise location. The components of the Haversine formula are incorporated herein by reference.

Additionally, the application may sort garage order based on distance from user. In an example, the application may select the closest predetermined number of garages, such as three or five garages, or any other suitable number, and then select the cheapest garage from within the selected closest group of garages. Therefore, the best garage may be selected via a second algorithm that identifies the cheapest garage within a subset of garages that are within the closest range to the user's current location.

The best garage may also be selected based on additional configurable subsets of parameters, such as user ratings, coupon availability, operational efficiency, greatest number of vacant spots, and any other suitable parameters. The user may also manually search for garages near an alternative target location entered into a search bar.

Figure 4:
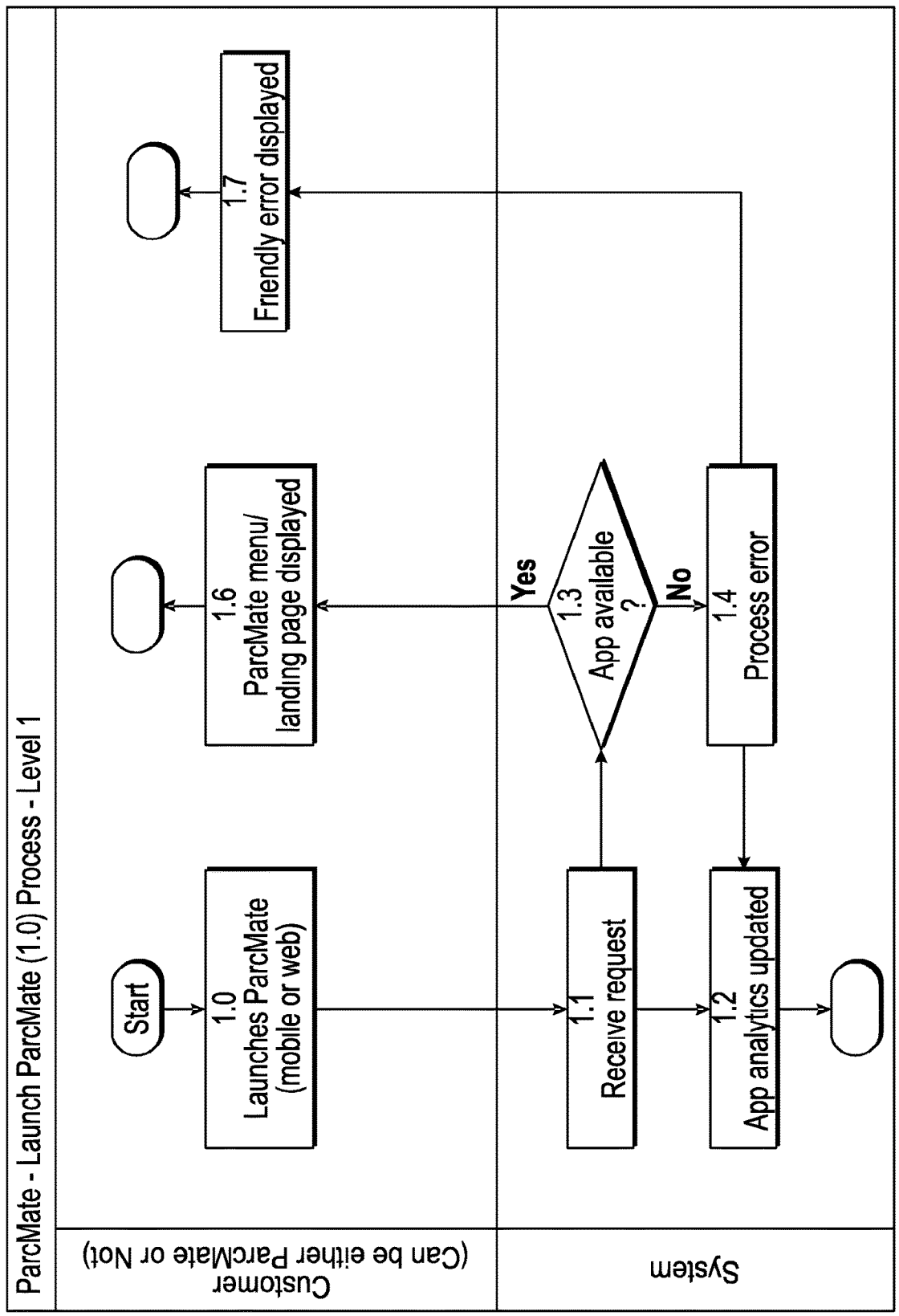
FIG. 4 is a flow chart depiction illustrating the opening of a digital application for a user to access the digital system disclosed herein
Figure 5:
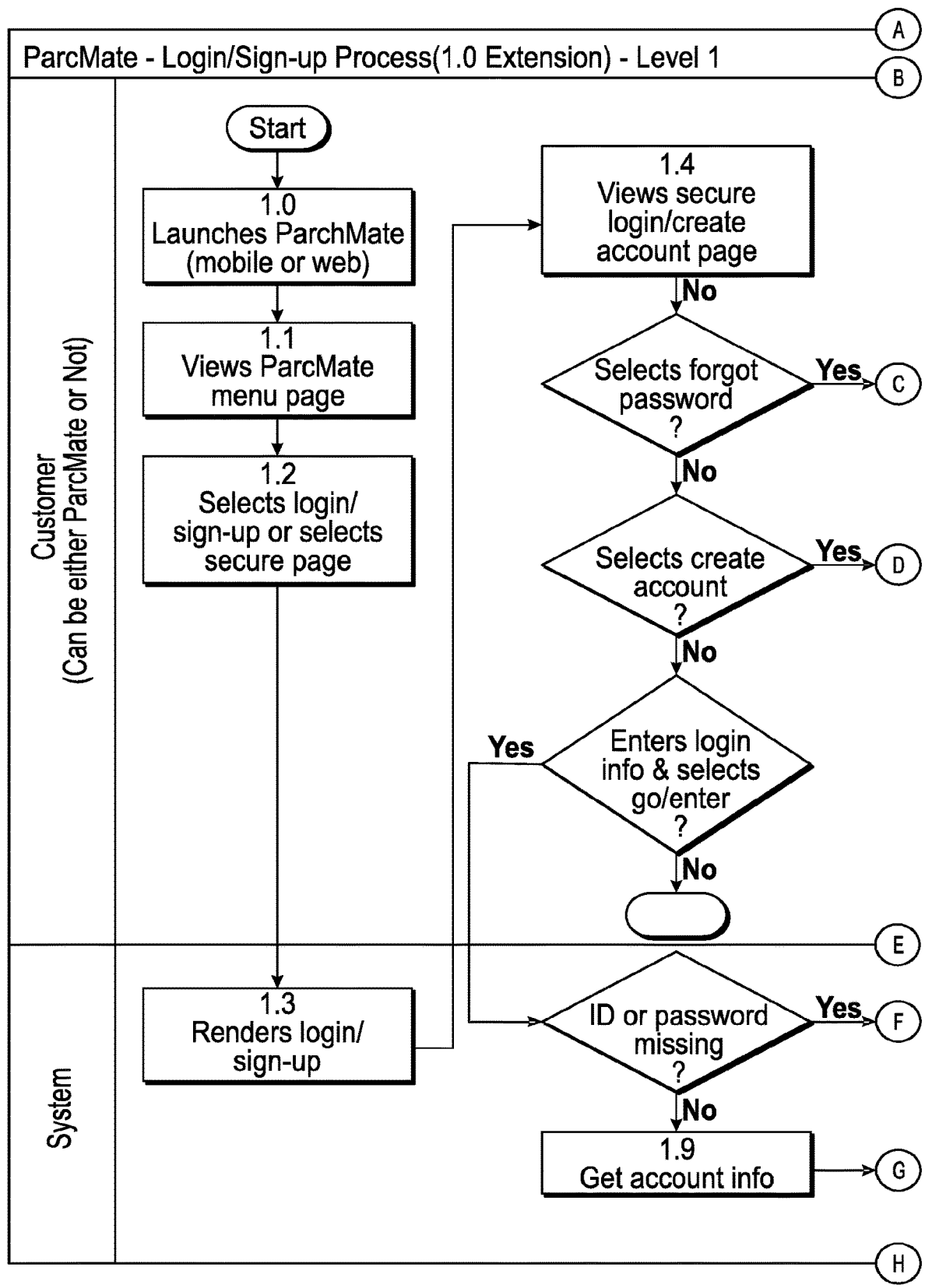
FIG. 5 is a flow chart depiction illustrating a user logging in to the digital system disclosed herein.
Figure 5:
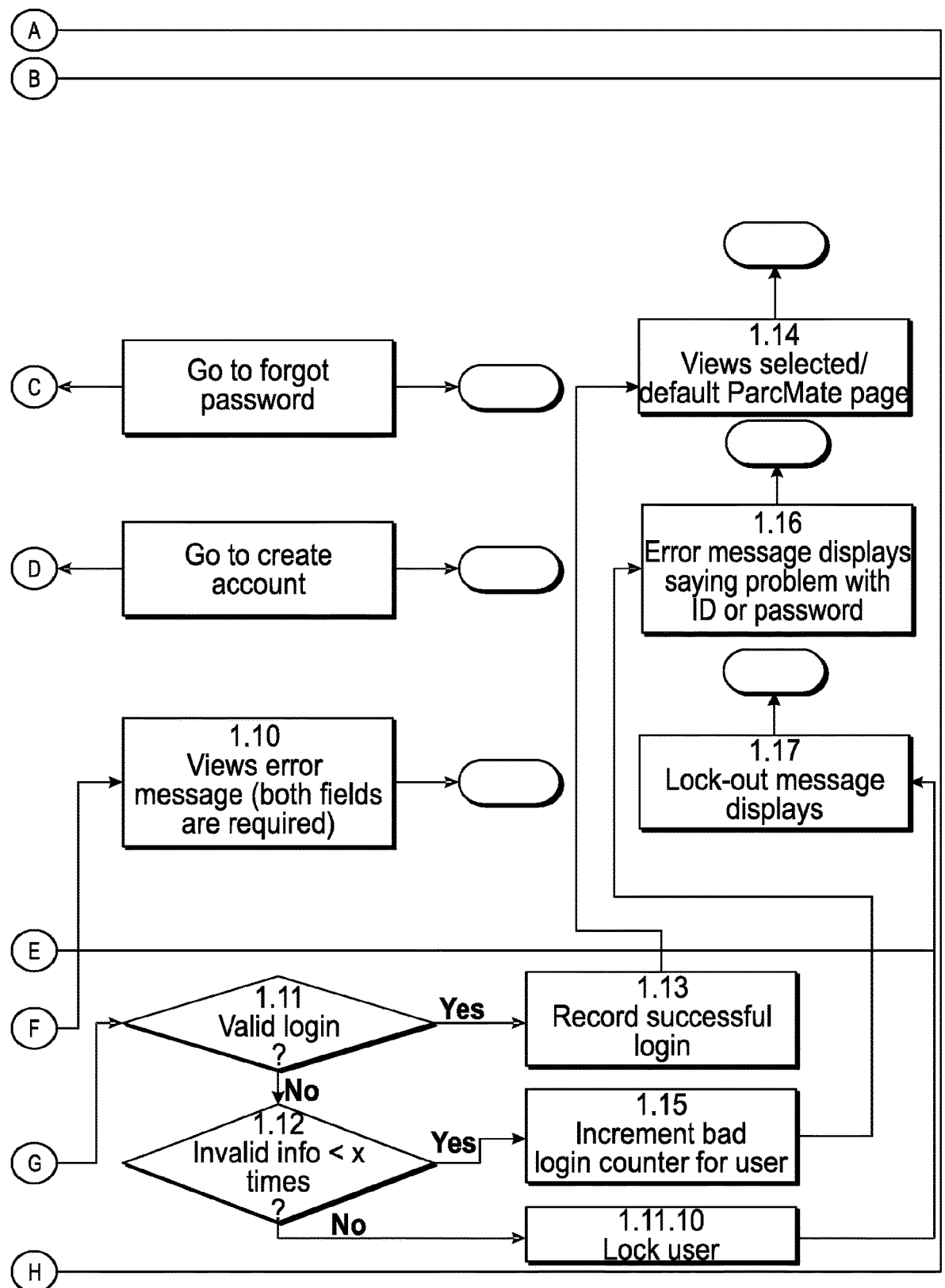
Figure 6:
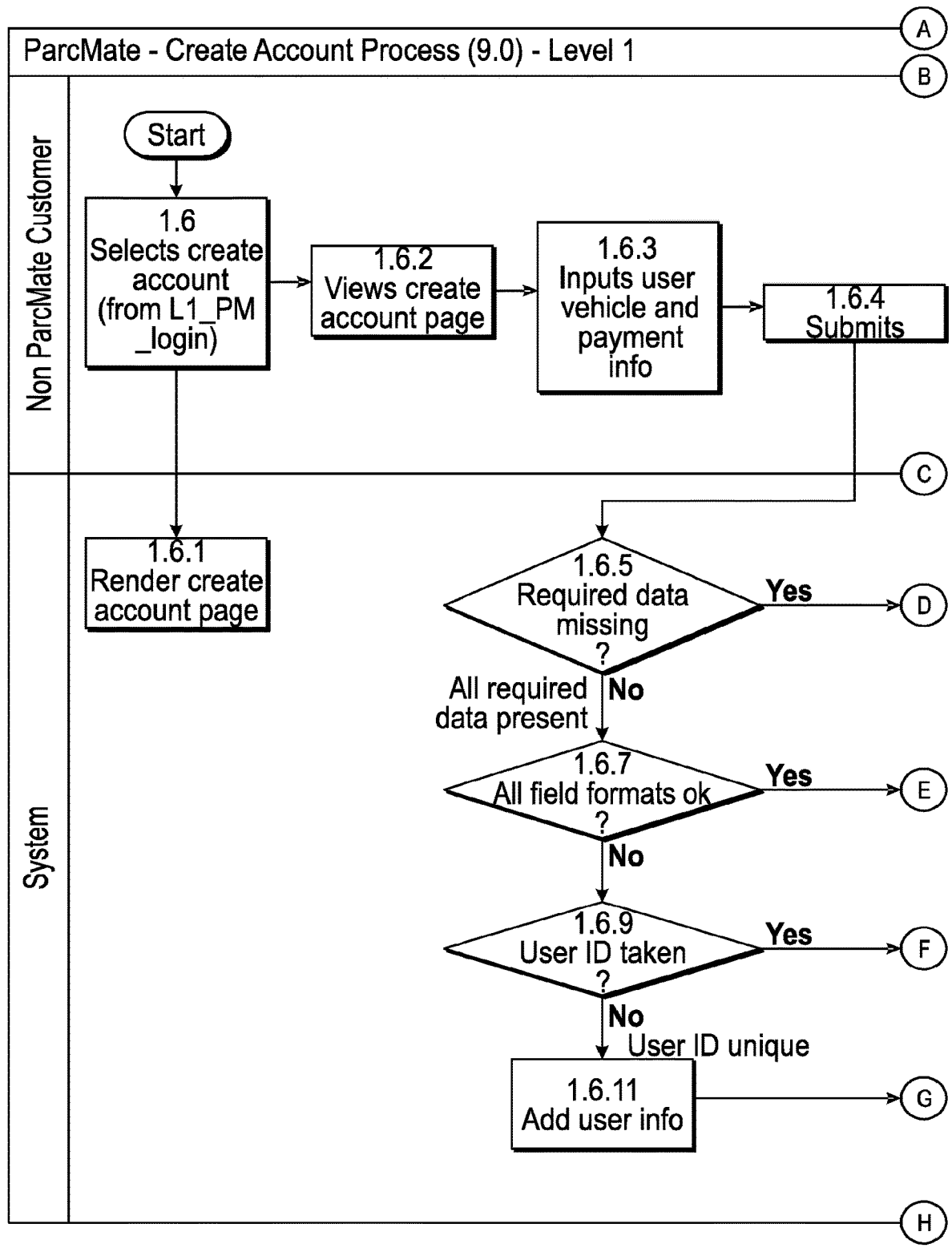
FIG. 6 is a flow chart depiction illustrating a user setting up an account in the digital system disclosed herein.
Figure 6:
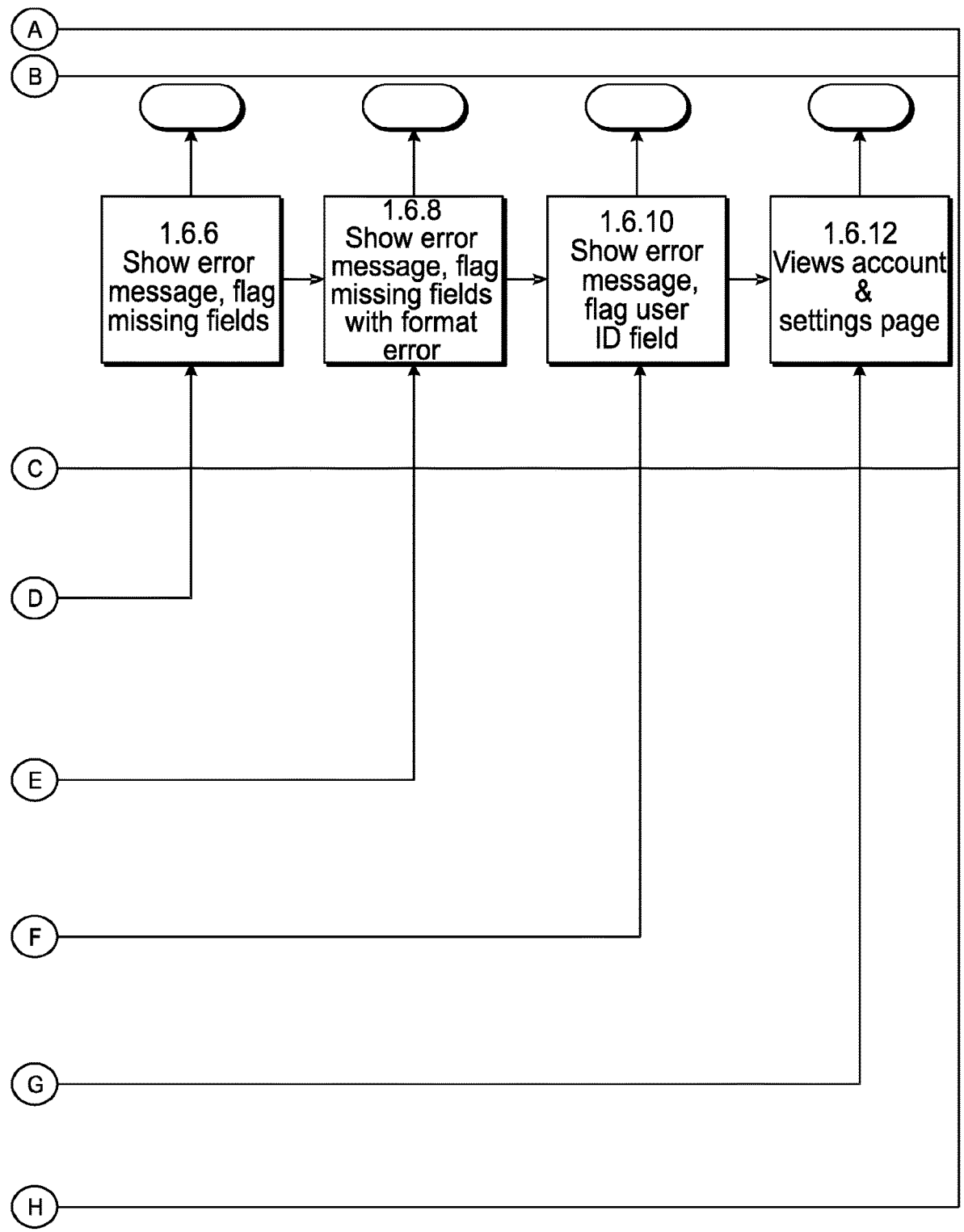
Figure 7:
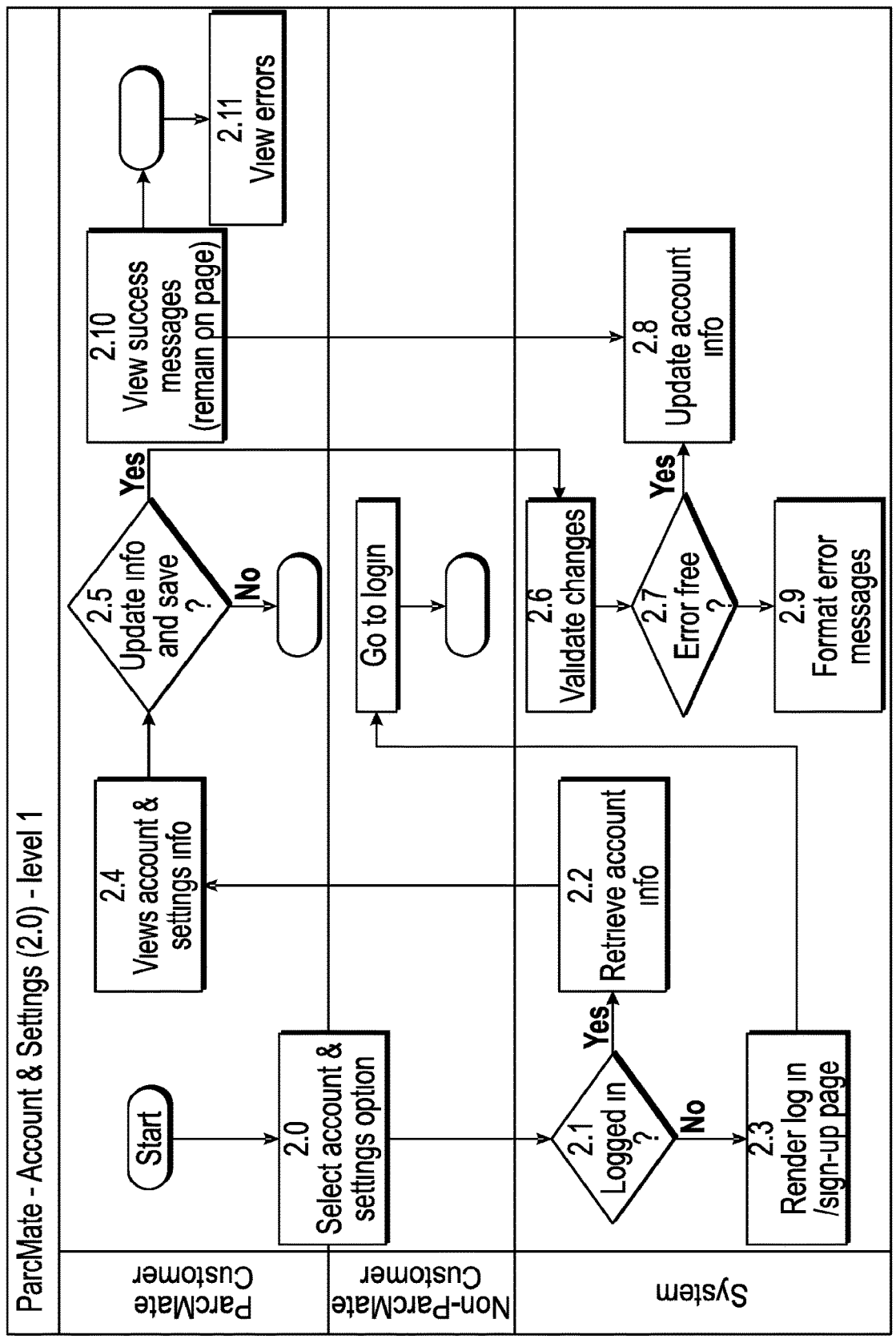
FIG. 7 is a flow chart depiction illustrating a user changing account settings in the account of FIG. 6.

FIGS. 4-6 illustrate how a customer logs onto the parking garage digital data system. As shown in FIG. 6, a user account 1.6.1 is created that includes identification of the user vehicle and payment information 1.6.3 and the user preferences in an accounts and settings page 1.6.12 and FIG. 7.

The user-facing ParcMate application provides parking search, selection and transaction capabilities, as well as a real-time window into their parking engagement. Users may reserve and transact both transient (hourly/daily) and monthly parking in an application. A direct digital connection to parking company pricing and inventory allows the system to provide a "Lowest Rate Guarantee" (i.e. pricing will not be lower anywhere else for a selected garage). With reference again to FIG. 2, as updated pricing and inventory data is transmitted to server 28, relevant information (for example, "Lot Full") is communicated with display board 26 for display to potential customers. Inventory may include a transmission, such as an email, that a lot is full, at which point the lot availability is removed from a garage database for a specified period of time, such as a start and end time.

Inventory data can be transmitted including that garage prior to the unavailable time (such as, for example, 6:00 PM), and after the unavailable time (such as, for example, 10:00 PM). If a user requests a stay that includes both available and unavailable time, the garage will be excluded from the inventory data. Alternatively, lot information, such as a full lot, may be communicated to a User's device. Display board 26 may also be used to balance demand between a plurality of garages. The displayed price may be lowered to increase demand or the displayed price may be increased to reduce demand. The lot status, such as "Lot Full" or "Lot Unavailable" could also be displayed on the user's device.

Demand-based pricing may be adjusted by quantifying real-time garage availability and historical garage demand patterns, and utilizing revenue management techniques to determine optimal pricing. Thus, historical price and demand information is analyzed and matched to future periods of time based on common elements, such as days of week, time of day, recurring events, or any other suitable elements, for a specific garage or group of like garages. This may be utilized to forecast optimal realistic occupancy and revenue, and then set a necessary rate to meet the occupancy and revenue goals. If real-time demand for a specific garage fluctuates from expected optimal occupancy or revenue rates, the invention is adapted to adjust rates dynamically, by re-optimizing occupancy and revenue based on the altered demand conditions.

Users will register vehicle information (one or many), credit card payment information and default tip amount (dollar amount or percentage of transaction), and any promotional rate codes they are eligible for, in the app. They can select a primary and secondary credit card payment options. The primary card will be used to automatically charge the user's ParcMate parking transactions. ParcMate will be the merchant of record for the ParcMate transactions.

Upon registering, users may have a single, perpetual, machine-readable identifier, such as a barcode or a quick response (QR) code, for each of their registered vehicles (combining vehicle information with user information), which can be used each time they visit a garage in the ParcMate network. With this identifier, unreserved parking transactions can be completed in a single click (click "check-in" and view barcode to scan); the full search and reserve process can be completed in just three clicks (click "find a garage", select a garage with default parking duration, confirm).

The following illustrates an exemplary use of completing the search and reserve process in three-clicks: Upon entering the "Find a Garage" section of the application, based on user geographic location, or entered location, the user is presented with a selection of garages based on longitude and latitude of the garages relative to the location, and the user can further select from the curated options of closest/cheapest/best (see below) or other garage options, and click to reserve.

In accordance with the invention, curating of options may include displaying small batches of options based on increasing distance from a user or target location, or based on a stored or entered latitude/longitude of each garage location. In one embodiment, best, closest or cheapest options are displayed on a dynamic mapping arrangement, as well as on tiles below the map. A user may swipe tiles to the left, or in any other suitable direction, which may cause the application to display new options on the map and replace the previously displayed options. Each swipe may be configured to replace previous options and display new ones.

An exemplary curation sequence includes:

```
1   package com.spaces.bo;
2
3   import com.spaces.App;
4   import com.spaces.core.cache.Cache;
5   import com.spaces.core.services.ServiceContext;
6   import com.spaces.core.util.Config;
7   import com.spaces.dao.*;
8   import com.spaces.domain.*;
9   import org.apache.commons.configuration.Configuration;
10  import org.slf4j.Logger;
11  import org.slf4j.LoggerFactory;
12
13  import java.util.*;
14
15  /**
16   * Created by Ben on 1/25/2016.
17   */
18  public class GarageSearch extends Cache<Garage> {
19      private static final Logger Log =
    LoggerFactory.getLogger(GarageCache.class);
20
21      private GarageRateBO rateBO = new GarageRateBO( );
22
23      private static Configuration config =
    Config.getConfig("spaces.properties");
24
25      private final double bestRange = config.getDouble("BEST_RANGE");
26      private final double othersRange =
    config.getDouble("OTHERS_RANGE");
27      private final int MAX_SEARCH_RESULTS =
    config.getInt("MAX_SEARCH_RESULTS", 40);
28
29      private static final String GARAGE_SEARCH_TRACE_USERS =
    config.getString("GARAGE_SEARCH_TRACE_USERS", ":7:9:11:");
30
31      private static final boolean GARAGE_SEARCH_FORCE_TRACE =
    config.getBoolean("GARAGE_SEARCH_FORCE_TRACE", false);
```

```
32
33          private Map<Integer, GarageRateStructure> rateCache = new
HashMap<Integer, GarageRateStructure>( );
34
35          public GarageSearch( ) {
36                  super(Garage.class);
37                  super.setLoader(App.getBean(GarageDAO.class));
38          }
39
40          public List<GarageSearchResult> getGarages(double lat, double lng)
{
41                  GarageSearchRequest req = new GarageSearchRequest( );
42                  req.setLat(lat);
43                  req.setLng(lng);
44                  long now = System.currentTimeMillis( );
45                  req.setEstimatedArrival(new Date(now));
46                  req.setEstimatedDeparture(new Date(now + 60 * 60 * 1000));
47                  return getGarages(req);
48          }
49
50          /**
51           * Get the list of garages sorted closest to farthest to the
specified location
52           * <p>
53           * Perform filtering logic on the list based on search parameters
(covered parking, open 24 hours etc)
54           * Perform logic around garage hours ( is the garage open or not)
55           * Return the cheapest rate basd on the rate structure/rate table
for the garage and the estimated arrival/departure
56           *
57           * @return
58           */
59          public List<GarageSearchResult> getGarages(GarageSearchRequest
request) {
60                  GarageSearchResult best = null;
61                  GarageSearchResult closest = null;
62                  GarageSearchResult cheapest = null;
63                  boolean couponAdded = false;
64
65                  int userId =
ServiceContext.getContext( ).getSession( ).getUserId( );
66                  Log.debug("Excecuting search for user [{ }]", userId);
67
68                  List<GarageSearchResult> results = new
ArrayList<GarageSearchResult>( );
69                  for (Garage g : super.getItems( )) {
70
71                          double distance = 0;
72                          if (matches(userId, g, request)) {
73
74                                  distance = DistanceUtil.distFrom(request.getLat( ),
request.getLng( ), g.getLatitude( ), g.getLongitude( ));
75                                  // Must be within ½ a mile
76                                  if (distance <= othersRange) {
77                                          GarageRateStructure rateStructure =
rateCache.get(g.getGarageId( ));
78                                          RateEstimate estimate =
rateBO.getCheapestRate(request, rateStructure);
79
80                                          if (estimate != null && (request.getMaxRate( ) < 0
|| estimate.getAdjustedRate( ) <= request.getMaxRate( ))) {
81                                                  GarageSearchResult result = new
GarageSearchResult(g);
82
83                                                  // Needs to be a coupon rate, and needs to be
not logged in user...
84                                                  if (estimate.isCoupon( ) && !couponAdded &&
userId < 0) {
85
ServiceContext.getContext( ).addMessage("FND-090");
86                                                          couponAdded = true;
87                                                  }
88
89                                                  result.setDistance(distance);
90
result.setEstimatedCost(estimate.getAdjustedRate( ));
91                                                  result.setCoupon(estimate.isCoupon( ));
92                                                  results.add(result);
93
```

```
 94                    if (result.getDistance( ) <= bestRange) {
 95                        if (best == null ||
result.getEstimatedCost( ) <= best.getEstimatedCost( )) {
 96                            // handle ties
 97                            if(best != null &&
result.getEstimatedCost( ) == best.getEstimatedCost( )) {
 98                                Log.info("found tie: best...
garage 1 { } garage 2 { }", best.getGarage( ).getGarageId( ),
result.getGarage( ).getGarageId( ));
 99                                if (result.getDistance( ) <
best.getDistance( )) {
100                                    // take this one its same
price but even closer!
101                                    best = result;
102                                }
103                            } else {
104                                // new best
105                                best = result;
106                            }
107                        }
108                    }
109
110                    if (closest == null || result.getDistance( ) <=
closest.getDistance( )) {
111                        // i dont think this is technically
possible, but wtf...
112                        if (closest != null &&
result.getDistance( ) == closest.getDistance( )) {
113                            Log.info("found tie: closest...
amazing garage 1 { } garage 2 { }", closest.getGarage( ).getGarageId( ),
result.getGarage( ).getGarageId( ));
114                            if (result.getEstimatedCost( ) <
closest.getEstimatedCost( )) {
115                                // take this one its same distance
but even cheaper!
116                                closest = result;
117                            }
118                        } else {
119                            closest = result;
120                        }
121                    }
122                    if (cheapest == null ||
result.getEstimatedCost( ) <= cheapest.getEstimatedCost( )) {
123                        if (cheapest != null &&
result.getEstimatedCost( ) == cheapest.getEstimatedCost( )) {
124                            Log.info("found tie: cheapest...
garage 1 { } garage 2 { }", cheapest.getGarage( ).getGarageId( ),
result.getGarage( ).getGarageId( ));
125                            if (result.getDistance( ) <
cheapest.getDistance( )) {
126                                // take this one its same price
but even closer!
127                                cheapest = result;
128                            }
129                        } else {
130                            cheapest = result;
131                        }
132                    }
133                } else {
134                }
135            } else {
136            }
137        } else {
138            // missed initial filter
139        }
140    }
141
142    // remove the B/C/C from the list
143    results.remove(best);
144    results.remove(closest);
145    results.remove(cheapest);
146
147    // Order here matters
148    if(best != null) {
149        best.addFlag("best");
150    }
151
152    if(closest != null) {
153        closest.addFlag("closest");
```

```
154            }
155
156            if (cheapest != null) {
157                if (best == null) {
158                    cheapest.addFlag("best");
159                    best = cheapest;
160                }
161                cheapest.addFlag("cheapest");
162            }
163
164            Collections.sort(results, new Comparator<GarageSearchResult>( )
{
165                @Override
166                public int compare(GarageSearchResult o1, GarageSearchResult o2) {
167                    return Double.compare(o1.getDistance( ), o2.getDistance( ));
168                }
169            });
170
171            // We only want 40ish...
172            int max = MAX_SEARCH_RESULTS;
173            if (results.size( ) < MAX_SEARCH_RESULTS) {
174                max = results.size( );
175            }
176
177            List<GarageSearchResult> realResults = results.subList(0, max);
178            if (cheapest != null) {
179                realResults.add(0, cheapest);
180            }
181
182            if (closest != null) {
183                // wasnt already added
184                if (realResults.indexOf(closest) < 0) {
185                    realResults.add(0, closest);
186                }
187            }
188
189            if (best != null) {
190                // wasnt already added.
191                if (realResults.indexOf(best) < 0) {
192                    realResults.add(0, best);
193                } else {
194                    // hack move it to the front
195                    realResults.remove(best);
196                    realResults.add(0, best);
197                }
198            }
199
200            return realResults;
201        }
202
203        private boolean matches(int userId, Garage garage, GarageSearchRequest searchRequest) {
204            if (searchRequest.isReturnAll( )) {
205                if (garage.getStatus( ) != Garage.Status.Active && garage.getStatus( ) != Garage.Status.SoftActive) {
206                    return false;
207                }
208            } else {
209                if(garage.getStatus( ) != Garage.Status.Active) {
210                    return false;
211                }
212            }
213
214            if (searchRequest.isOversizedVehicle( ) && !garage.isAcceptOvesized( )) {
215                return false;
216            }
217            if (searchRequest.isMustAcceptCreditCards( ) && !garage.isAcceptCc( )) {
218                return false;
219            }
220            if (searchRequest.isOpen24Hours( ) && !garage.isOpen24Hours( ))
{
221                return false;
222            }
223            if (searchRequest.isOnlyCoveredParking( ) &&
```

```
!garage.isCoveredParking( )) {
224              return false;
225           }
226
227           // Must be open on the arrival time and departure time!?
228           if (!garage.isOpen(searchRequest.getEstimatedArrival( ))) {
229              return false;
230           }
231           if (!garage.isOpen(searchRequest.getEstimatedDeparture( ))) {
232              return false;
233           }
234           return true;
235        }
236 }
```

Additionally, all garages may be displayed in aggregate on the map, without geographic constraints. User-implemented filters, such as price maximum, indoor/outdoor, or any other suitable filters matched to user inputs with garage data stored in the database may be utilized to include or exclude garages. Garages may be further arranged on the map in concentric circles that increase in diameter based on the distance from the user's location.

U.S. Pat. No. 7,834,778, "Parking Space Locator," to Browne et al. discloses a method to identify available parking spots by obtaining a geographic indicator available for an available parking space and a geographic indicator for a parking space requestor and then match an available spot with a requestor in geographic proximity. U.S. Pat. No. 7,834,778 is incorporated by reference herein in its entirety.

Figure 8:
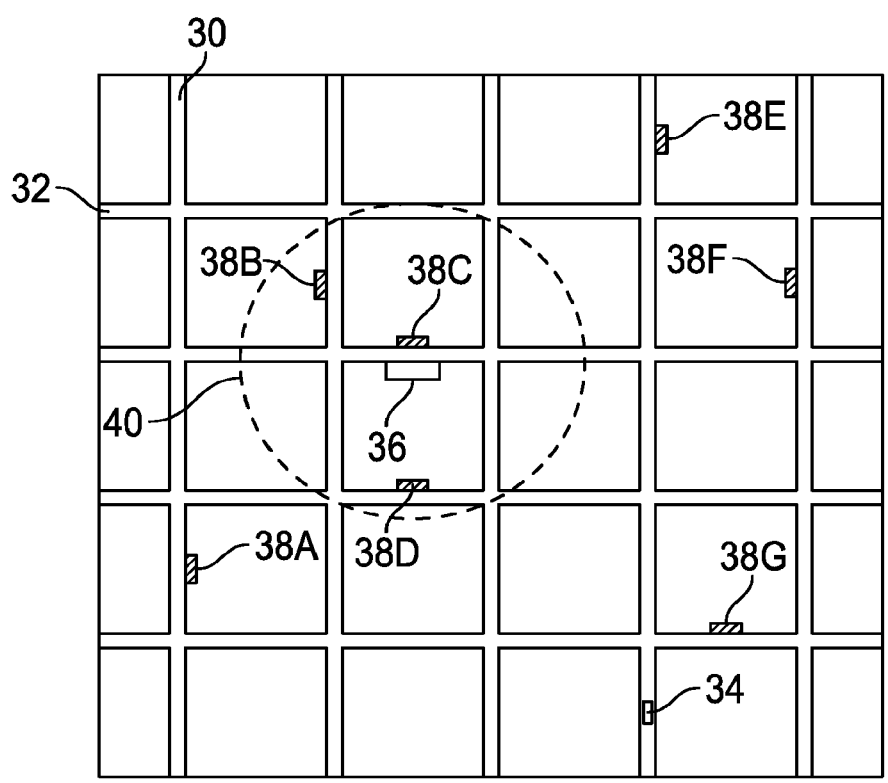
FIG. 8 depicts a city street grid to illustrate how the system described herein directs a user to a parking garage.

With reference to FIG. 8, users can search for garages in the ParcMate application based on current location, other location or point of interest, indicating a desired arrival time and a parking duration. The application returns a curated list of Best, Closest, Cheapest options with available spots per our proprietary algorithm. User has the ability to see additional garage options if desired. FIG. 8 illustrates a stylized street grid having north/south traveling avenues 30 and east/west traveling streets 32. A user 34 seeks parking to attend a destination 36. The user's location is dynamically tracked using a global positioning system. The coordinates of the destination 36 are similarly quantified. Also located in the database are the locations of parking garages 38A-38G. The parking garages are in continuous communication with the central server and provide continuous or periodically updated batch data as to parking spaces available and current rates. The user then selects a preference from the curated list and the best fit garage having spaces available is identified:

Best—lowest price within a small, such as 0.25 mile, or any other suitable distance, radius 40 of the destination. Garages 38B, 38C and 38D satisfy the geographic restriction. The system will select the one garage from those three having the lowest price and an available spot and direct the user 34 to that garage. Best can be further influenced by consumer-driven ratings of garages which have been stored in the system and continue to be updated based on ParcMate user feedback.

Closest—geographically closest to the destination without considering price. The system will direct the user to garage 38C provided there are spaces available and to 38B if spaces are not available in the closest garage.

Cheapest—rather than restrict the search to a small radius 40, a larger search area, such as a 1 mile radius in any direction is considered and the user 34 is directed to the garage from the larger population of 38A-38G having the lowest price.

All garage options may be presented with a rating score based on ParcMate user feedback from experiences with each garage. Ratings are gathered at check-out via a simple, automated process within the final receipt screen shown on the user's device, where user can provide a rating score, and additional written feedback. The system stores all ratings and feedback for each garage and dynamically updates the presented user rating score for each garage as it averages in, in real time, any new user ratings for that garage. User comments can also be displayed to other users in the ParcMate application.

Figure 9:
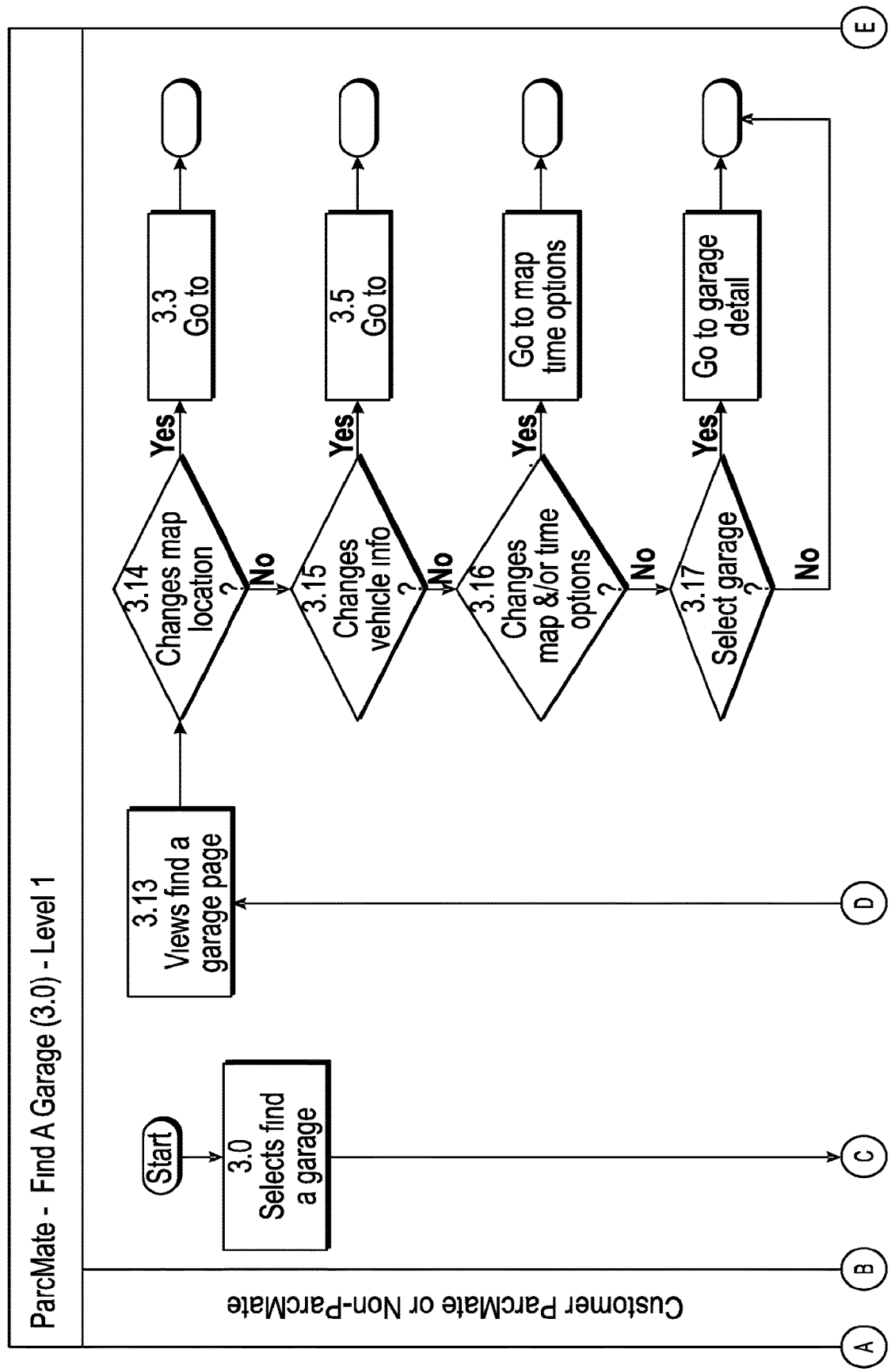
FIG. 9 is a flow chart depiction illustrating how the system directs a user to a parking garage as illustrated in FIG. 8.
Figure 9:
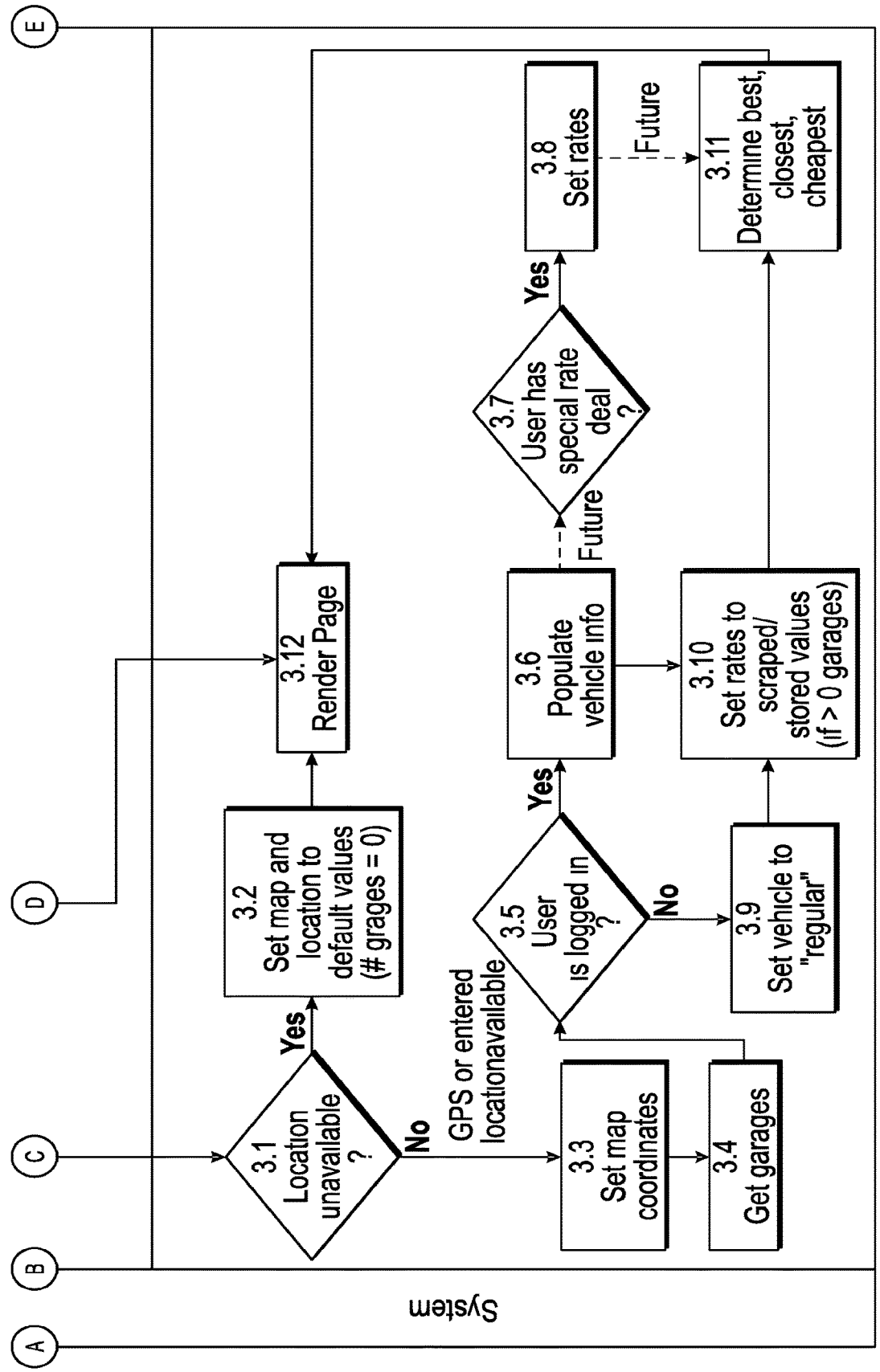
Figure 10:
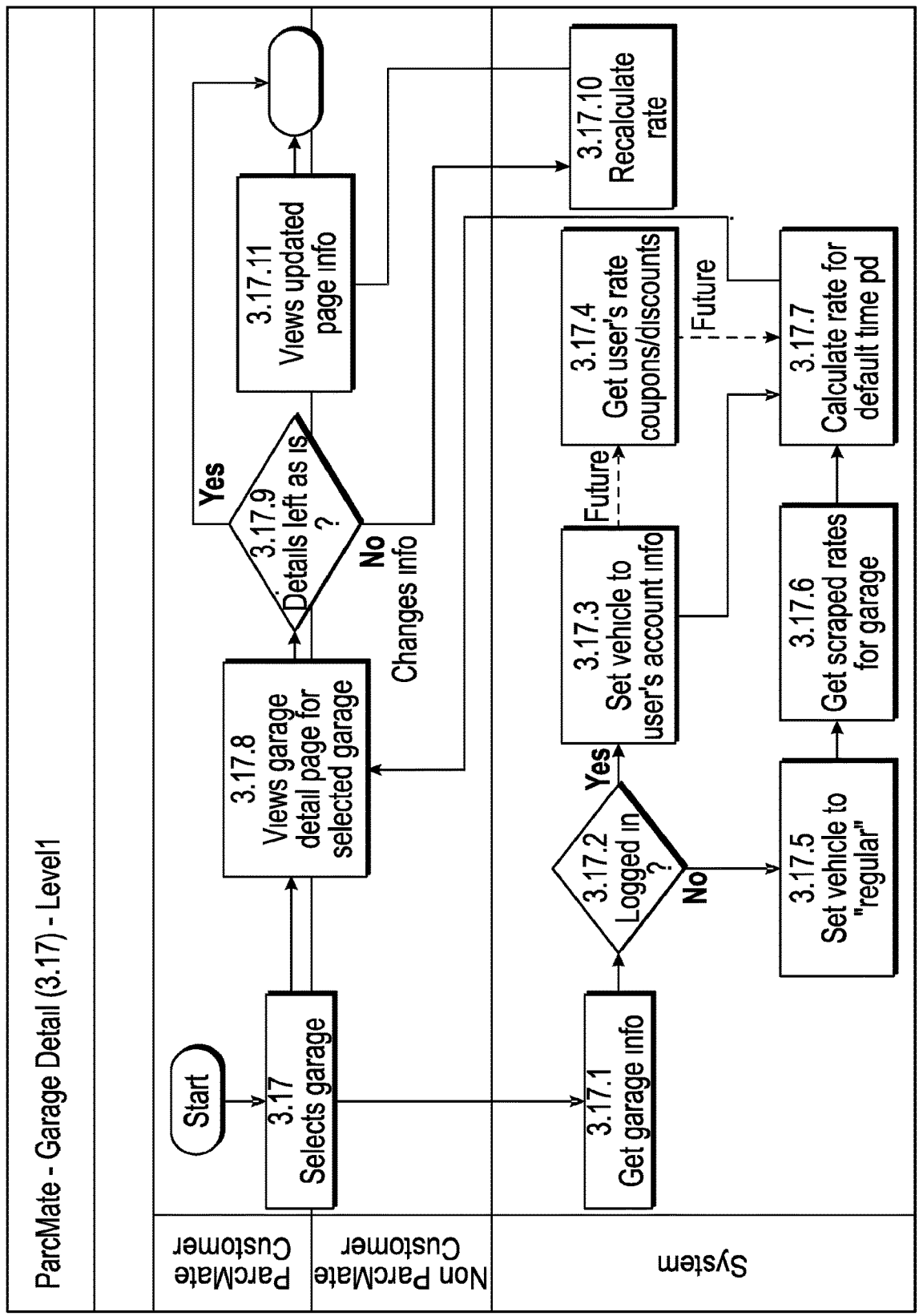
FIG. 10 is a flow chart depiction illustrating how, when the user selects a garage to make a reservation, information is transmitted directly to the garage system
Figure 11A:
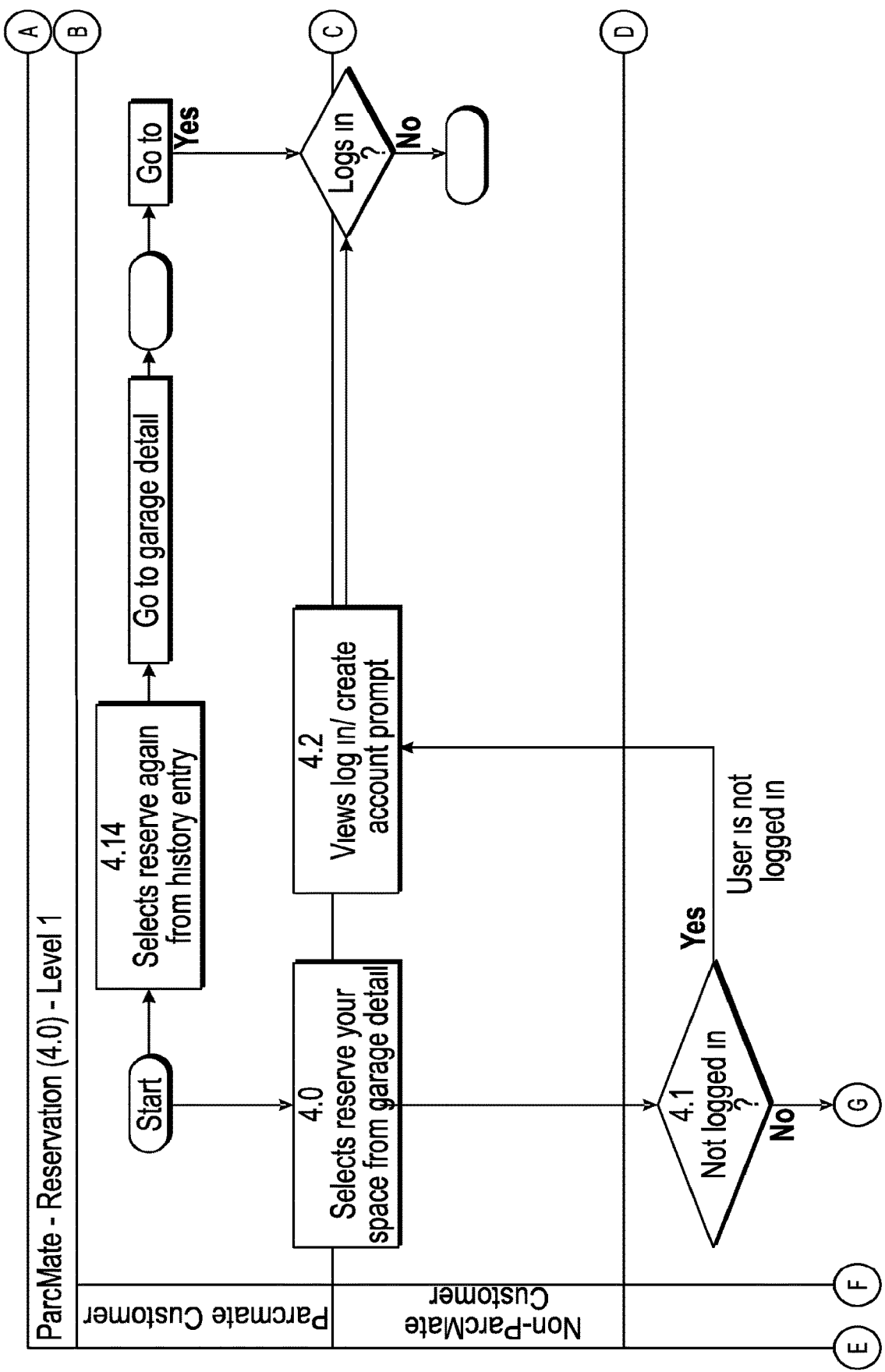
FIGS. 11A-11D are a flow chart depiction illustrating a reservation process.
Figure 11B:
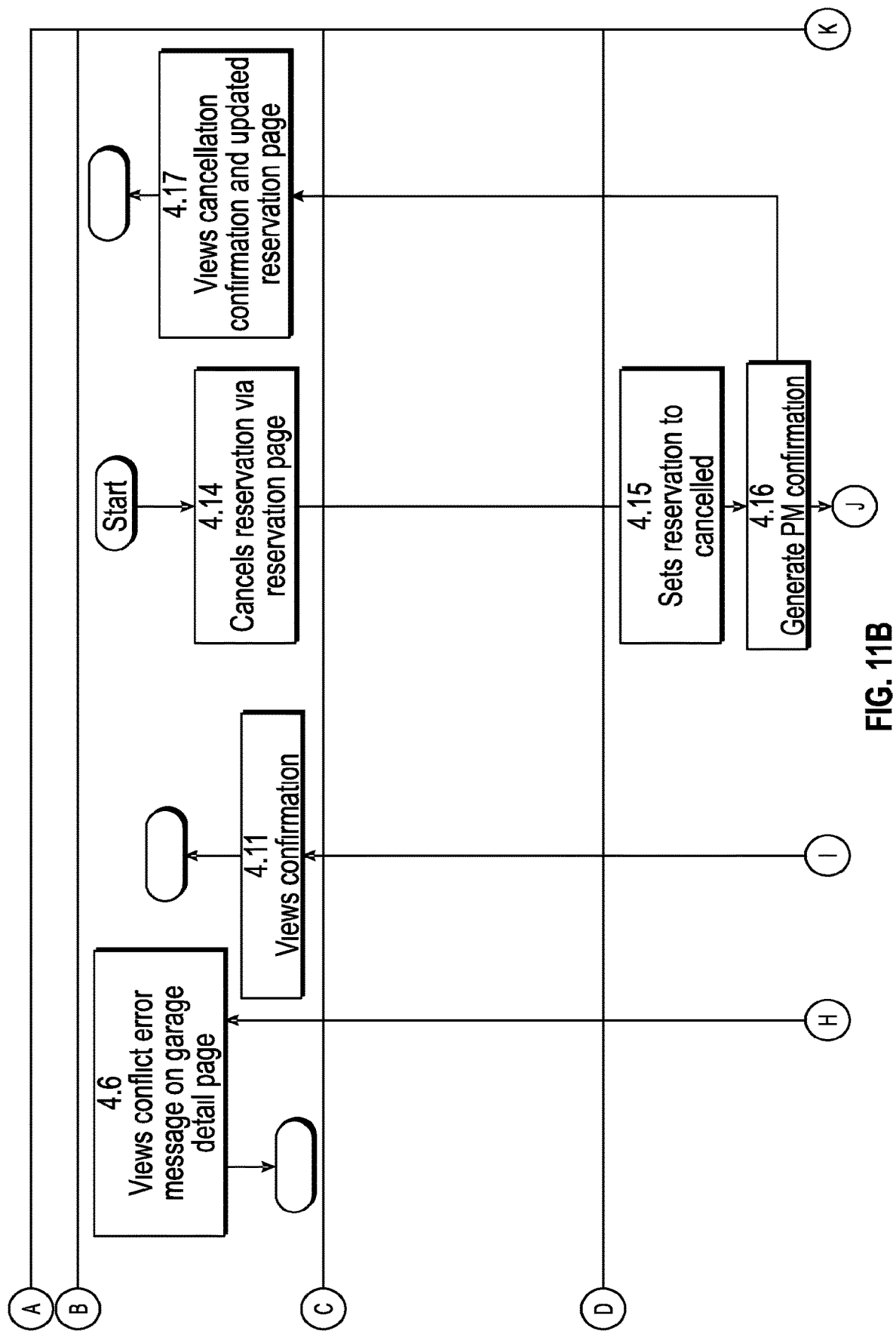
Figure 11C:
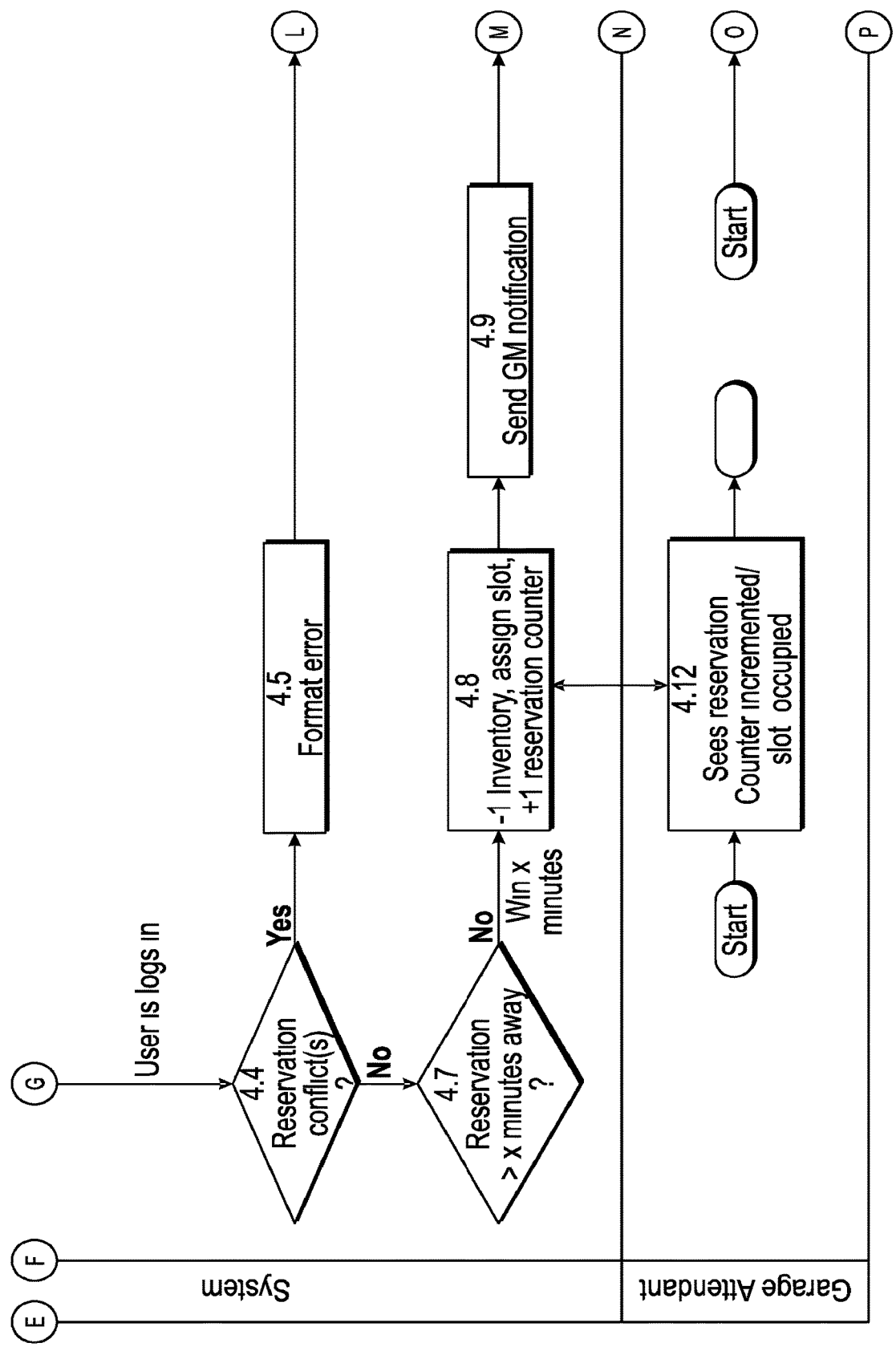
Figure 11D:
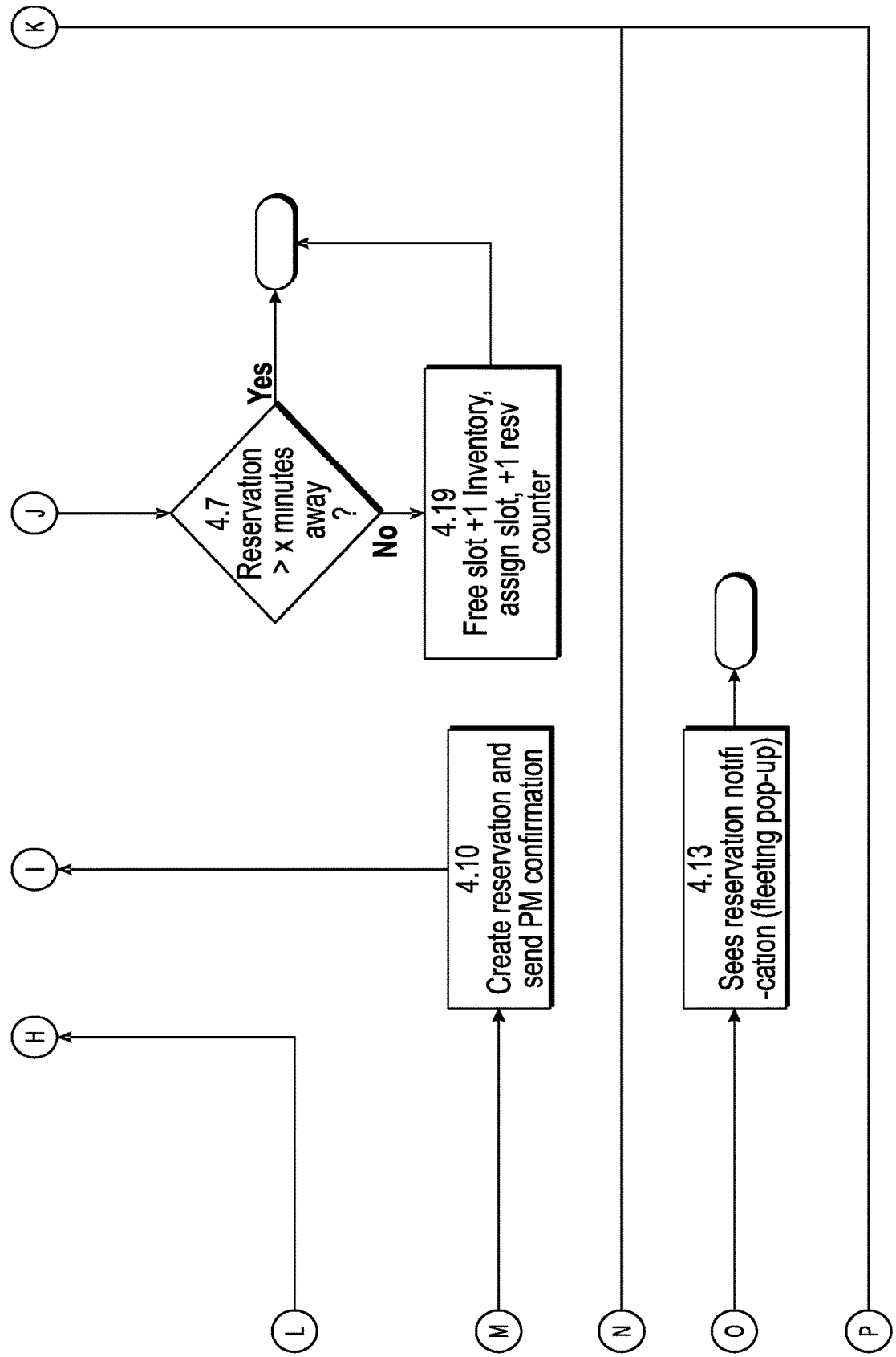

FIG. 9 is a flow chart depiction illustrating how the system directs a user to a parking garage. Step 3.3 sets the coordinates of the destination and step 3.4 identifies the garages within the predefined geographical boundaries. Rates for the identified garages are obtained at 3.10 and the system identifies the curated choices of "best," "closest" and cheapest" at 3.11. The user may then select from the curated choices at step 3.17 or ask for additional options. As shown in FIG. 10, when the user selects a garage to make a reservation; the user, vehicle, parking details and reserved rate is transmitted directly to ParcMate's companion garage system. While FIG. 11 illustrates the reservation process.

The following illustrates an exemplary use of the combination of coordinates and prices to direct the user to the best, closest or cheapest garage per user's selection: The system begins with a broad range of possible garages and narrows that selection based on a configurable maximum distance from the user's location or desired location as entered into the application, presenting garage options based on any individual or combined, configurable distance requirement, rate requirement and rating requirement. Users can further curate the list by selecting filters to remove any options not conforming with stated requirements (for example maximum rate, form of payment, type of structure (indoor/outdoor), attended vs. self-serve, etc.). If user is not pleased with the results, geographic constraints can be removed by asking to see more garages a further distance away from the target location.

Users can further request other services from the application as part of a reservation, or after their car is parked (to have their car ready to be picked up from the garage at a specific hour, to have the car washed, fueled up, cleaned, have parking time extended, etc). That information is transmitted to the companion garage platform, and the user receives a confirmation, rejection and/or explanation relating to the requested additional service.

Figure 12:
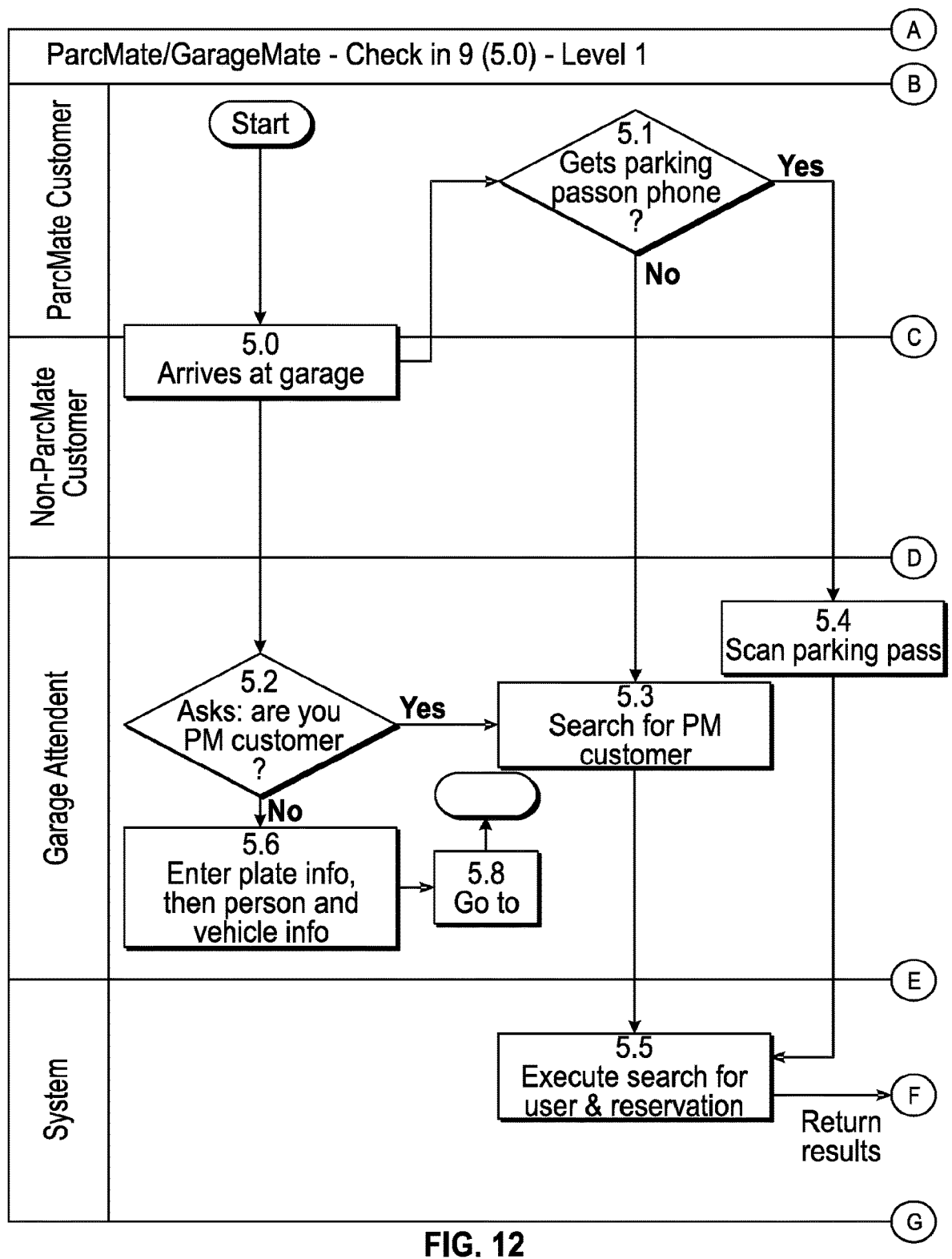
FIG. 12 is a flow chart depiction illustrating a check-in process.
Figure 12:
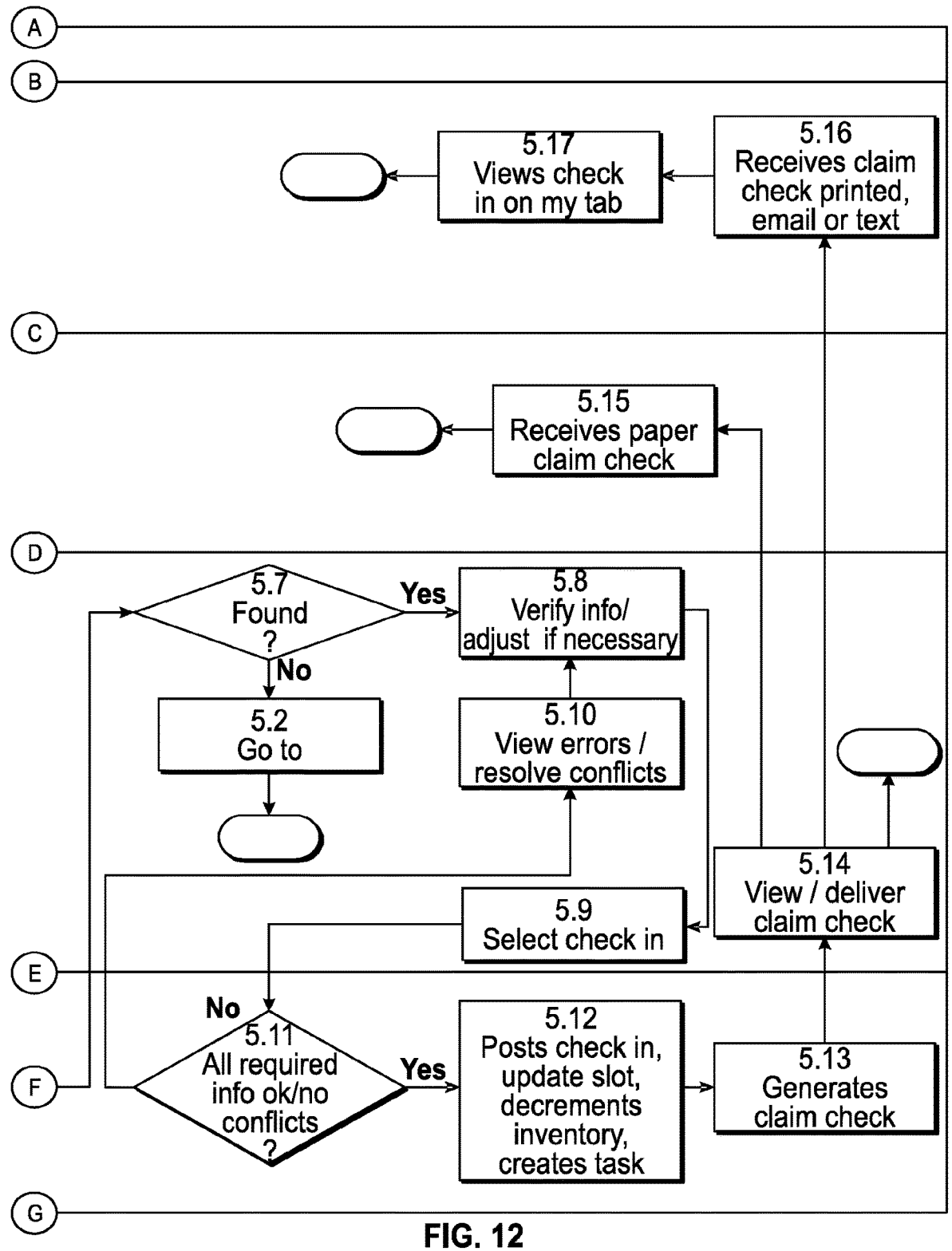
Figure 13A:
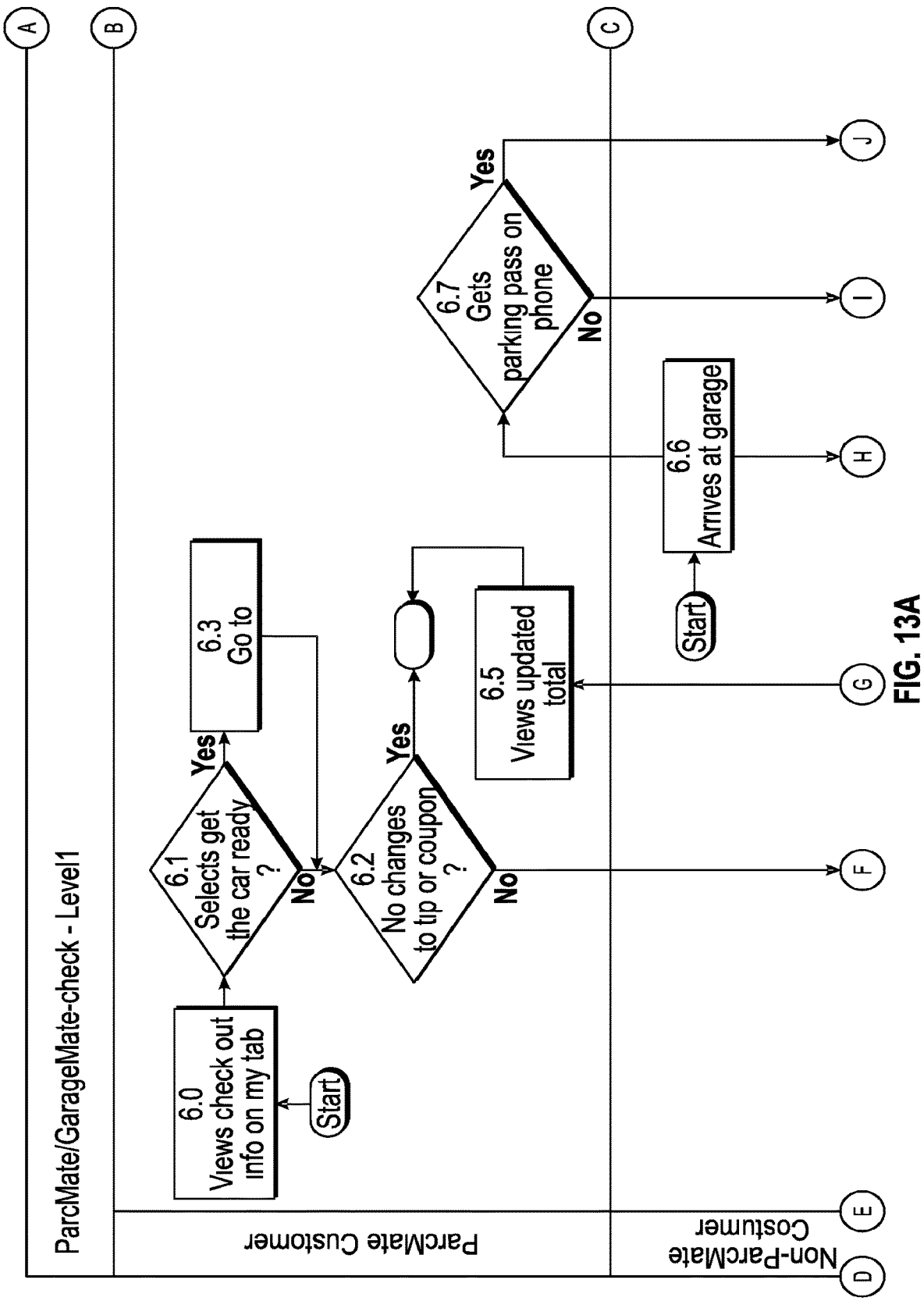
FIGS. 13A-13D are a flow chart depiction illustrating a check-out process.
Figure 13B:
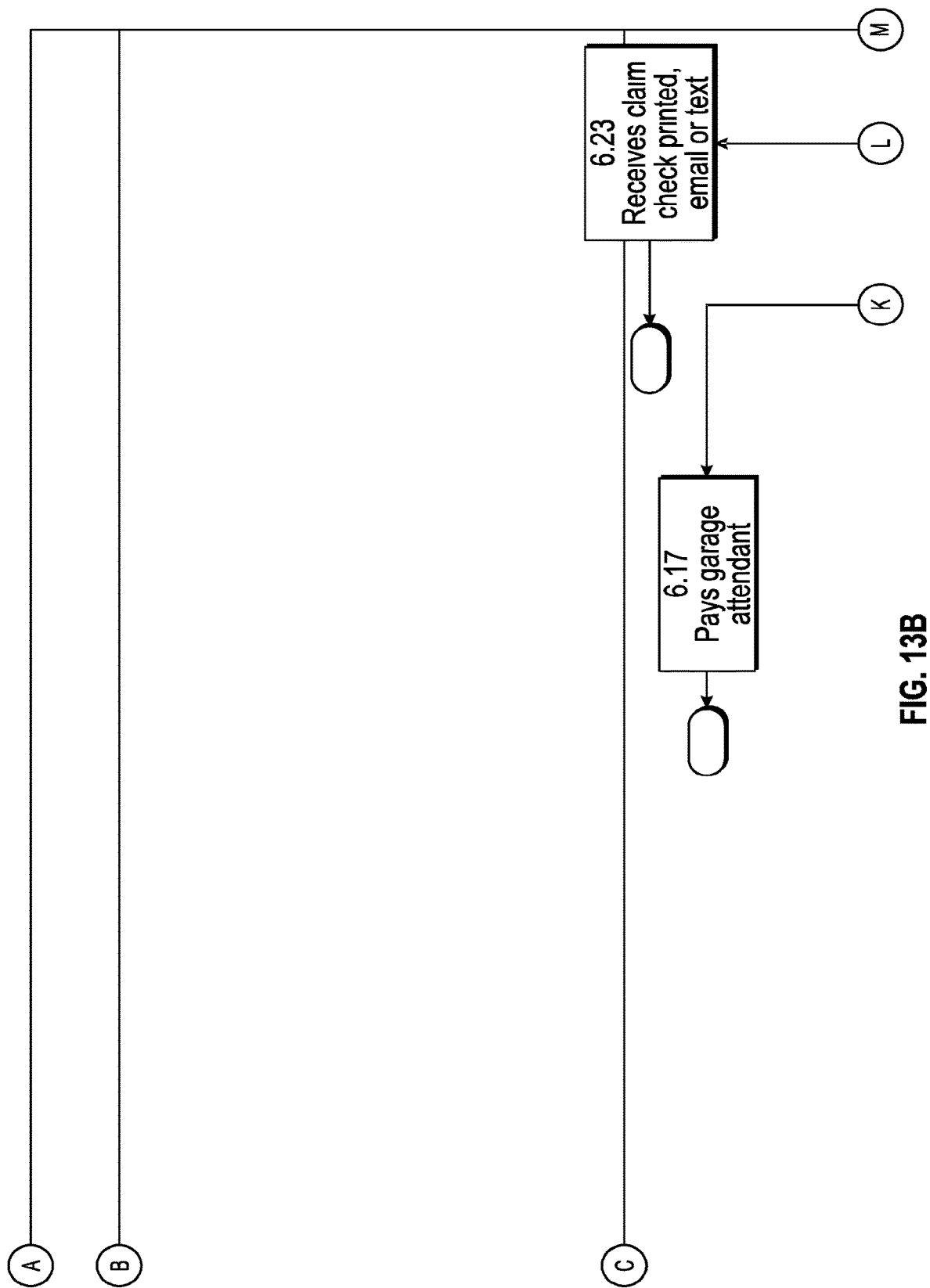
Figure 13C:
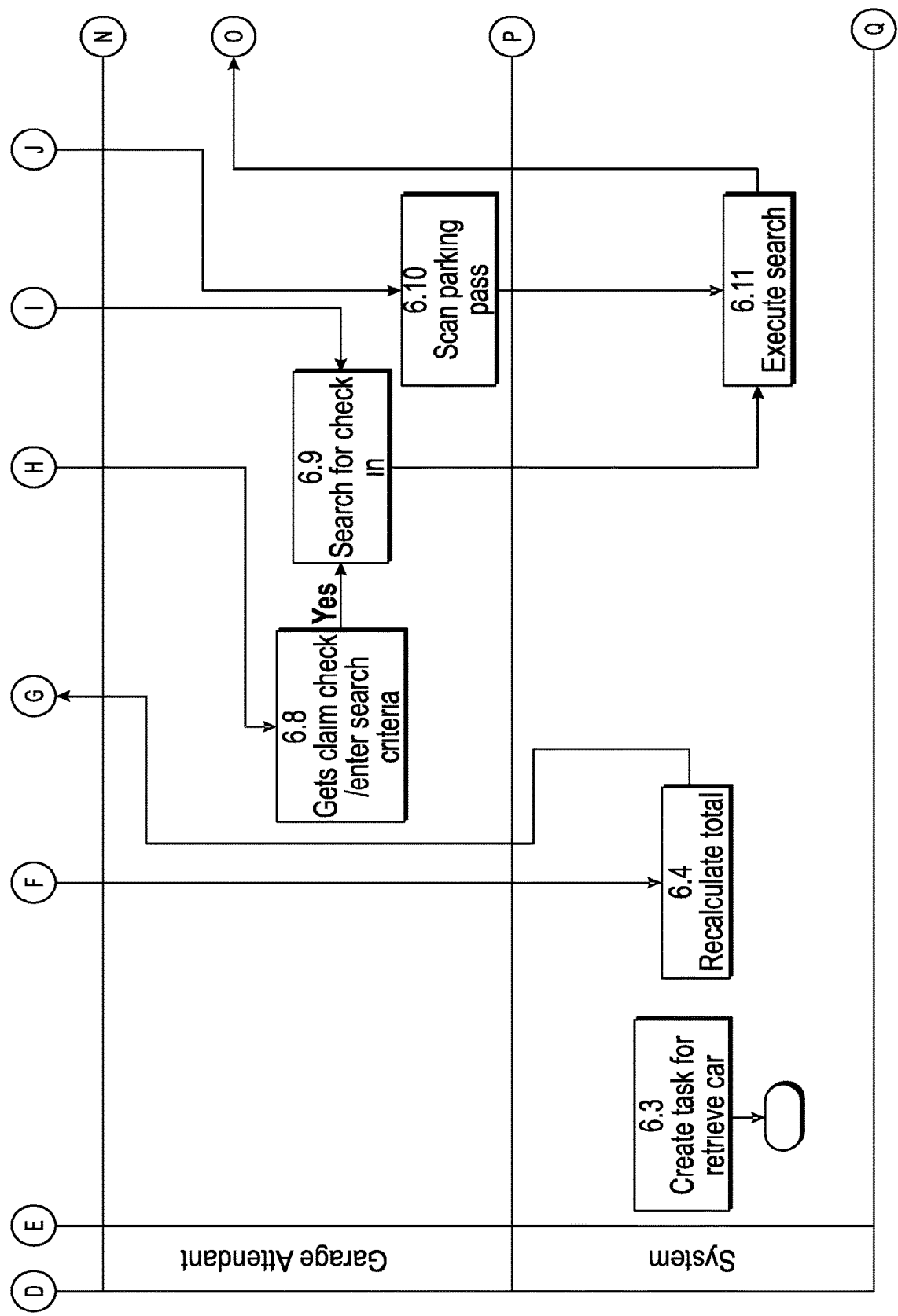
Figure 13D:
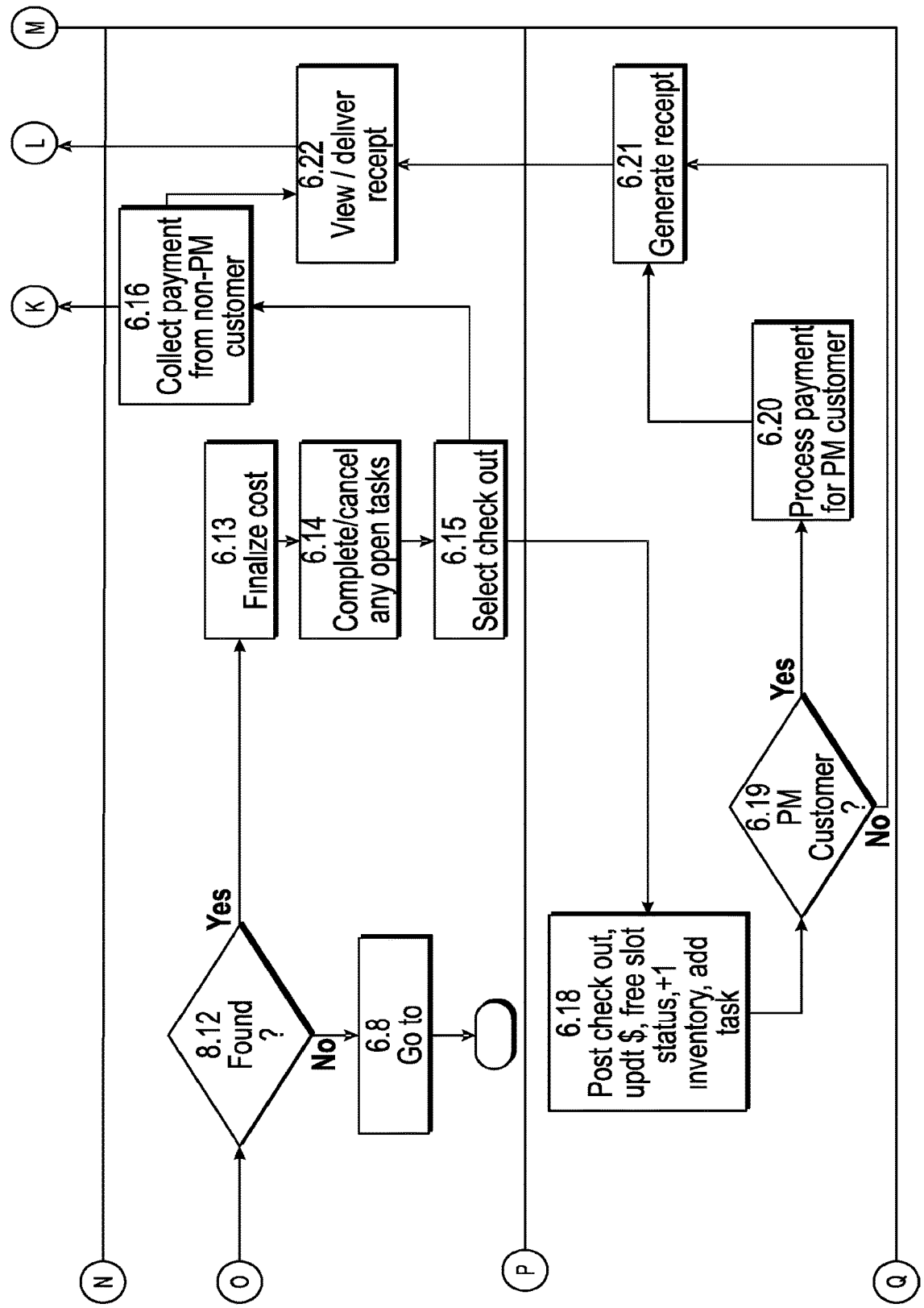

Referring now to FIG. 12, upon arrival in a ParcMate garage, if ParcMate user has made a reservation, garage scans the user's bar code or QR code for the vehicle they are driving 5.3, bringing up complete reservation information (duration, price, vehicle information, license plate, user name) and spot allocation information in the companion garage platform, GarageMate. This is all the information that the garage needs for this scenario. With a single click confirming the information, the user is checked in, and they can leave. The application creates a unique bar code/QR code for every user/vehicle combination, containing key data about the user and the vehicle that has been retained in the system from a profile created by the user that can be used every time the user checks in or out of a garage in the ParcMate system.

If a ParcMate user has not made a reservation, they can still enter a garage in the ParcMate garage network, and with just a single click in the application, scan their barcode or QR code. Vehicle, license and user information then dynamically populate the GarageMate system. Garage attendant only needs to ask for the estimated duration of the stay, and the ParcMate user is given the applicable rate, with any discount they are eligible for, considered automatically in the rate calculation. The information is confirmed, the user is checked in, and can leave.

While their car is parked, within the ParcMate application, in the "my tab" screen, user can view real-time cost of their parking stay through that moment in time, and see at what points in time in the future parking cost will rise and to what specific dollar amount. Users can also extend their stay from the application.

With reference to FIG. 13, upon returning to the garage to retrieve their car, the ParcMate user scans their barcode 6.10 with the garage attendant into the GarageMate system, final amount is confirmed 6.13, final car location within the garage is shown 6.12, guest is checked out, car is retrieved, ParcMate user instantly sees the receipt in their ParcMate application, the final parking cost, and the default tip amount (per their registration profile), which can be changed. User either confirms final total amount and primary credit card in registration profile is charged, or after 15 minutes or other configurable amount of time without further action, final amount is charged to primary credit card on file.

Alternatively, upon entering a garage, a beacon device emits a signal to the phone application letting the application know that the customer is in that particular garage, passing the garage information to the application to allow it to check-in/out the customer. When the customer checks-in, the stored vehicle information (along with user details) for any selected vehicle within the user profile can be automatically passed via an API to the garage's existing point of sale system. The application can then pull back from the garage system the garage system ticket number, which is stored electronically within the phone, and generating a check-in time. Estimated cost of stay is provided to the driver based on a full rate structure obtained by ParcMate from the garages, and includes all standard rates, specials, coupons and specially negotiated rates for monthly and transient customers. Coupon rates are handled electronically, and do not require drivers to manually display a code or a printed coupon to qualify. While parked, the customer can view in real time what the current cost of parking is, as well as any possible upcoming rate changes through time, synthesizing all rates/specials/coupons to show the lowest applicable rate for any particular time period. When not in range of the beacon (away from the garage) the driver cannot check out. Upon returning to the garage, when in range of the beacon, the customer can check-out via a click in the application, and complete final payment. The payment amount is calculated from rates stored in the ParkMate system, but verified against the garage rates stored in the garage point-of-sale system, via an API and based on check-in and check-out times. If there is a discrepancy, the system defaults to the garage system rate for check-out and final payment. The garage system is notified of a completed final payment for that driver/ticket number via the API, resulting in the ticket showing paid and closed out in the garage system, generating a paid receipt for the garage attendant, and causing the attendant to retrieve the driver's car.

In the event the user does not check-in with the application at the garage, the user can scan the garage-issued parking ticket/claim check into the application, to view in real time what the current cost of parking is, as well as any possible upcoming rate changes through time, synthesizing all rates/specials/coupons to show the lowest applicable rate for any particular time period. They will also be able to check-out and pay via the application.

Stays for the ParcMate user can be commissionable to ParcMate on an automated basis; however, the application allows for a variable (reduced) commission rate based on the frequency and volume of stays for a user at any one ParcMate garage.

The application will track and allow redemption of parking reward credits, based on previous parking stays consumed in the application.

The application allows for tracking, monitoring and usage of promotional offers unique to the user. The user can see at any point, in real time, promotional offers they have qualified for, through registration, referral or referring, or usage of an offered referred to another individual, and when those offers have been used. If they have qualified for multiples of any one offer, the application keeps track of used and remaining. The application retains and can display details of any offer (when/how earned and redeemed), allows the user to select if a particular promotion is redeemed for a parking stay, and dynamically updates final pricing for consumer based on value of the promotion. Stored rules of the promotion determine whether users qualify for earning and/or redeeming any given offer. The back-end system can attribute the cost of the promotion to ParcMate, or the garage, or any split between the two, such that any amount attributed to ParcMate does not decrement the full amount due to the garage from ParcMate for the stay, even if the user has paid a lesser amount due to the promotion. Similarly, commission is calculated based on the full amount due to the garage, regardless of the promotional discount attributed to ParcMate.

The application allows for a method for selecting a "Universal Park" option across a set of affiliated garages in the integrated garage system. This option allows user to select a product of unlimited parking within a subset of garages and/or days or dayparts for a specified period of time for a designated cost. That option is tied to the user profile so the parking transaction can be consumed as part of that option without being charged separately for the transaction.

The application allows for a "Vehicle Request Feature", whereby the user can request to have their car waiting for them upon return to the garage/parking facility—at a particular time in the future (i.e. 4:45 pm) or a certain time from the current time (i.e. 30 minutes from now). The cost for this service can vary by parking facility, time of day, and customer (i.e. monthly customers may be allowed to do so for free, or heavy ParcMate users reaching a certain status in the loyalty program). This feature can integrate into existing garage notification systems via an API, or communication can be facilitated via a dedicated ParcMate device that displays upcoming vehicle ready requests for attendants.

The ParcMate application will serve up dynamic, targeted advertising, connecting advertisers with consumers based on any combination of the following data within the system: search location, planned arrival time, planned departure time, user profile demographic information, vehicle information, parking behavior, to name a few.

The ParcMate ecosystem includes GarageMate, a cloud-based, efficient, streamlined point-of-sale system for garage locations and attendants for facilitating inventory management and parking transactions. This system will be accessed through a portable tablet with scanner, printer, and credit card reader, will interface with ParcMate in real time, and will connect into current parking company financial systems. In the event garages use an alternative point-of-sale system, GarageMate information can flow electronically or manually into and out of their existing point-of-sale system and onto any connected financial systems.

GarageMate also allows for user reservations to be automatically assigned a specific spot inventory based on garage-specific algorithms in the integrated garage system allowing garage attendants to easily reassign spot assignments as needed and keep track of current car location within the parking facility.

For any ParcMate user and vehicle combination entering a garage and scanning a barcode, or leveraging beacon technology or RFID technology, or any other identification mechanism, with or without a reservation, GarageMate will check its database of reservations for an existing reservation at that garage within a configured broader timeframe. Within a more limited, configured timeframe, the reservation will be automatically connected to that user at that time. If a reservation exists for that user/vehicle between the limited and broader timeframes, the garage attendant will be prompted to determine if this stay is for that other reservation, to avoid double-booking of inventory. This entire process can be facilitated with GarageMate used by the garage attendant as an intermediary or via the ParcMate user directly, using GarageMate as a "self-serve kiosk." If there is no reservation, the ParcMate user is checked in as a new user.

GarageMate has a fully integrated task management and notifications system, so attendants can be alerted to cars that need to be parked or retrieved for pending pick-up. Consumers utilizing the consumer side app can automatically generate a task to pick up their car at a specific time, or have ancillary services completed on their car (car wash, clean, add fuel, etc), configured specifically for each garage. Garage attendants have the ability to accept, reject, or reply regarding the consumer task requests via a two-way communication system.

Garage attendants will use the system to manage transactions for every customer utilizing the garage (those using the consumer side app and walk-ins without the app), from check-in to check-out and transaction payment. Payment can be made via cash or credit card reader on portable tablet. Consumers registered in the consumer-side application will have payment transacted through the app itself.

GarageMate will generate claim checks for non-consumer side application users, which can be printed, e-mailed or texted. Consumer side application users use their unique bar code (per user and vehicle) or any other unique identifier as retrieved from the system, in the application as their claim check, but can be printed, e-mailed or texted another one by the garage through the garage system if needed.

The GarageMate tablet can take photographs of any arriving car via its built-in scanner (reference numeral 22 in FIG. 2), and those photographs can be stored with each car profile so proof of existing damage can be retained. Those photographs can be shared across garages.

The system also allows for a complete business intelligence system for parking company management, providing data analytics, tools and dashboards, and an easy to use inventory pricing system, across the parking company portfolio, via its GarageMate Pro component.

In particular, GarageMate Pro provides a proprietary analytics and reporting tool, providing data from the garage point of sale system such that management can have a complete 360 degree view of demand and inventory in real-time. Garage management can see trends, historical and current, reflecting occupancy, average hourly rates, average transaction amounts, average duration, transaction amounts per discrete duration lengths, revenue per available space (RevPAS), RevPAS per hour, and total revenue for each garage, and across any grouping of garages within a garage company. Data can be trended across hours, days, weeks, months, years, and filtered by specific dayparts (i.e. 9 a-5 p only) and days of the week (i.e. weekdays only).

The GarageMate Pro system allows management to leverage the business intelligence contained herein to make dynamic strategy adjustments across multiple garages simultaneously, driving rate where demand is high and volume where demand stimulation is needed. Users view the results of those strategic actions in real-time in the application.

With parking locations across garage companies in our ecosystem, GarageMate Pro will allow garage management to create a competitive set ("compset") for each of their garages, to which their "subject" garage performance can be compared. Indexes for the subject garage against the compset garages will be provided for occupancy, average hourly rate, revPAS, revPAS per hour, to help assess relative performance across various periods of time. Compsets will be aggregations of a minimum number of competitive garages such that no individual competitive garage's performance can be unmasked.

The GarageMate Pro business intelligence and related tools and reports are enabled by an underlying comprehensive data base system that stores all data associated with each individual parking transaction for each garage that is part of the ParcMate network (whether a ParcMate user or not), along with key garage and user details, that can be queried against and aggregated to generate the analytics mentioned herein. GarageMate Pro data can be fed directly from GarageMate in real time or periodically, and/or from periodic uploads from other garage point-of-sale systems.

GarageMate Pro can be the source of record for all garage pricing, to facilitate implementation of strategies. From a central location, pricing can be set and changed for each garage location within a garage company. For each garage, management can create within this platform their standard rate card, eligible discounted rates for broad or defined user groups across any time period, and special rates. Any rate other than those on the standard rate card can be set as a flat rate, a discount percentage off of the standard rate card or a dollar amount off the standard rate card. Rates can be set for a single garage or applied to multiple garages simultaneously. Pricing changes made here are immediately visible in both GarageMate (for garage attendants) and in ParcMate (for consumer application users).

The invention further allows for unique discount promotional rate codes to be associated with rates available only to specific user groups (employees of a specific business, residents of a specific building, diners at a specific restaurant, etc.). These promotional rate codes, when entered into ParcMate user registration screen, ParcMate reservation screen, GarageMate check-in screen, will automatically find the applicable rate in the GarageMate Pro system associated with that code, compare the eligible discount rate to the lowest generally available rate, and apply the lowest of the two to the reservation.

For monthly parkers, GarageMate Pro can store various monthly parking rate tiers, and other custom monthly rate amounts, for each garage. Each monthly rate has a single associated monthly rate code which can be associated with any number of vehicles, such that any driver using one of those vehicles as a ParcMate user or a non-ParcMate user is not charged a rate for each transaction within their home garage, being a "monthly parker." The monthly rate code enables a garage industry pricing standard whereby transactions at the "home garage" are not charged (as they are part of the monthly billed amount), but when visiting any other garage within the garage company, that code results in an automatic percentage discount (set by garage company) to the lowest applicable standard rate for those non-home garage parking transactions. The system will also execute billing of monthly parking amounts and enable multiple users to be covered under one monthly rate for each shared vehicle.

GarageMate Pro will facilitate billing of monthly rates. Any vehicle associated with a monthly rate will be billed that monthly amount, on the designated monthly billing date (with prorating logic for stub months).

GarageMate Pro is also the source of record for garage capacity configuration, via an easy "garage spot builder" tool. Management can "build" each garage, with spot numbering and naming conventions unique to each garage.

GarageMate Pro is further the source of record for garage spot assignment methodology, via an easy "garage spot assigner" tool. Management can indicate assignment methodology based on parker arrival time, departure time and duration unique to each garage, such that spots are automatically and optimally assigned when ParcMate users make a reservation at a garage or any walk-in arrives at a garage.

GarageMate Pro will allow garages to offer targeted discount rates based on a ParcMate user's specific geographic search that is beyond a specific garage's immediate area. The system will dynamically calculate a cheaper rate for this "further but cheaper" garage that is below the "cheapest" rate returned in the ParcMate user's geographic search. Garages will have to pay a listing fee to be added to the user's search results in this way.

Figure 14:
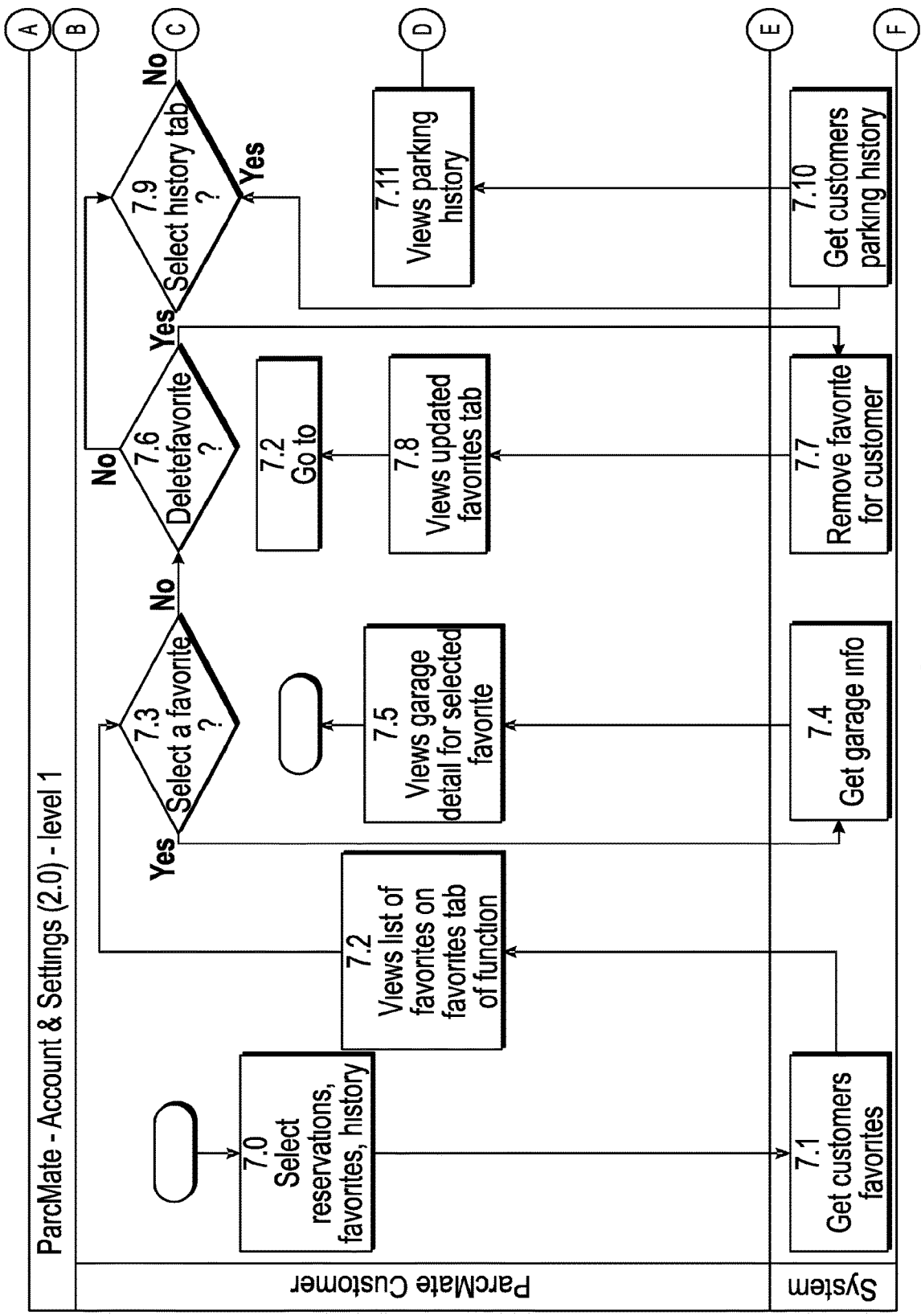
FIG. 14 is a flow chart depiction illustrating designation of a favorite garage in accordance with an alternative embodiment herein.
Figure 14:
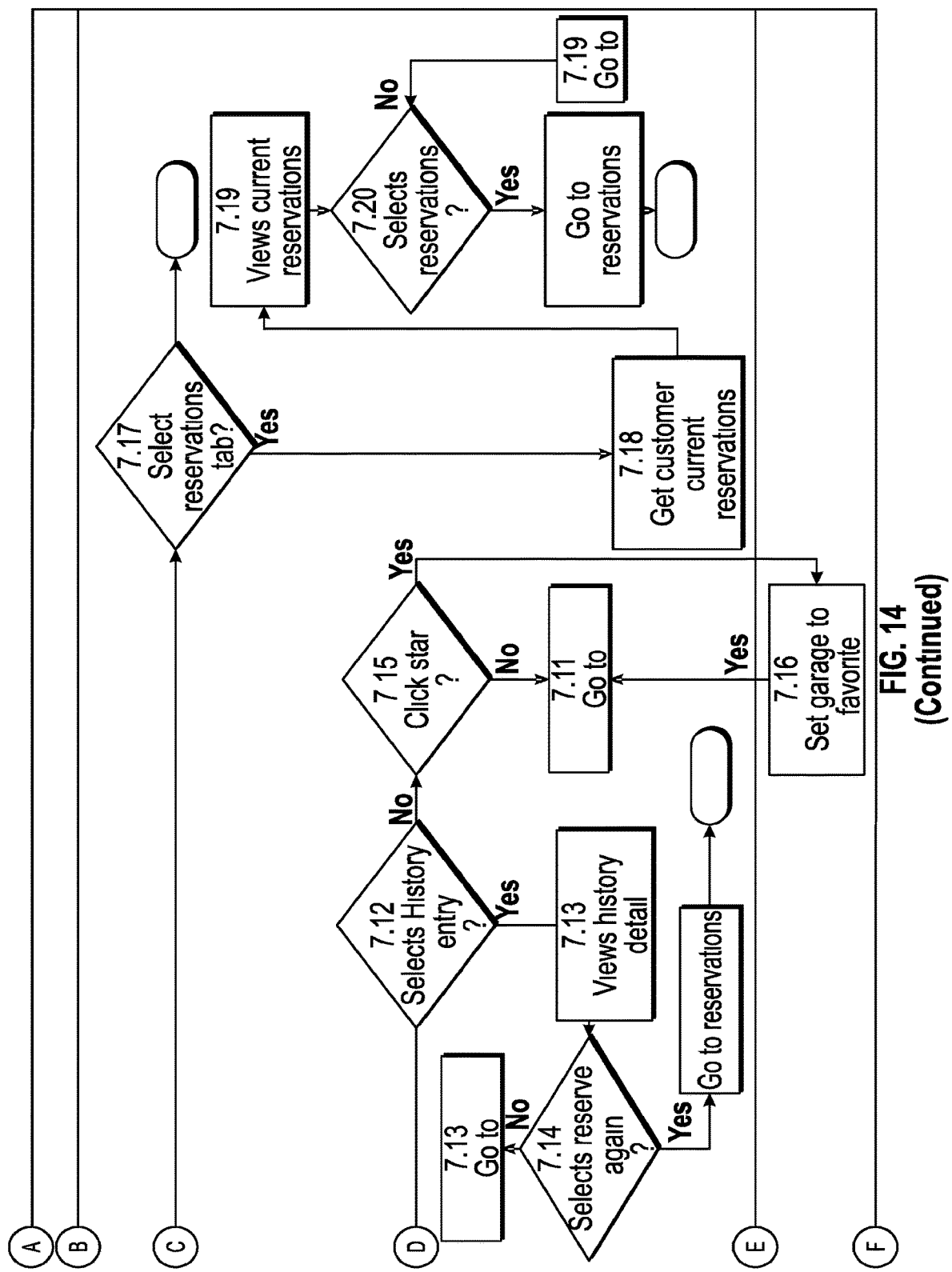

With reference to FIG. 14, rather than the curated selection of garages described with above, the user can designate a series of favorites, such as ancillary services offered, such as able to change oil, wash the car, elevator to street level, and the like and the select a garage 7.5 based on the designated favorites.

In self-park facilities with gated or attendant controlled entry/exit, ParcMate users can scan their QR or barcode for entry and exit via GarageMate scanners at the entry and exit points (self-serve or via any attendant on premises), with final amount due charged automatically to a credit card stored in the user profile. ParcMate users can alternatively be charged using any other suitable garage point-of-sale system.

Alternatively, ParcMate will leverage existing Smartphone "touch to open" technology to allow ParcMate users to touch their phone across a sensor to open gates at gated facilities upon arrival, at which time the parking duration starts counting and parking costs accrue based on stored information and logic in the ParcMate system. Upon departure, the same "touch to open" technology can be leveraged to open the exit gate, end the parking stay and the parking cost accrual. ParcMate can keep track of current parking costs throughout the stay and display this information to the user, along with any upcoming rate changes, as well display final parking costs and execute payment via a credit card processor. This information may transmit via an API to GarageMate or other suitable garage point-of-sale system.

In the event the user does not check-in to the gated facility with the application, the user can scan the garage-issued parking ticket/claim check into the application, to view in real time what the current cost of parking is, as well as any possible upcoming rate changes through time, synthesizing all rates/specials/coupons to show the lowest applicable rate for any particular time period. They will also be able to check-out and pay via the application.

For open lot configurations with numbered spaces, ParcMate will use Beacon technology installed at entry/exit points to identify that the user is at a particular lot location. The user can enter his space number in the ParcMate application and "check-in", at which time the parking duration starts counting and parking costs accrue based on stored information and logic in the ParcMate system. For lots that require a specific duration to be pre-paid, the user can select the duration required and that amount will be charged to the credit card stored in the user profile. For lots that allow the user/driver to pay parking costs on departure, ParcMate can keep track of current parking costs throughout the stay and display this information to the user, along with any upcoming rate changes, as well display final parking costs and execute payment via a credit card processor.

Alternatively, for open lots without specifically numbered spots and requiring prepayment, ParcMate can transmit the user's automobile make, model and license plate to the parking authority in real time, along with amount paid and paid duration, to authenticate the parking stay for that vehicle, and to determine if/when that vehicle can be ticketed for overstaying the paid duration.

For meter parking, on- or off-street, ParcMate users will be able to enter or scan an identifier for the specific meter into the ParcMate application that contains all relevant pricing information, select a parking duration and have the amount charged automatically to a credit card stored in the user profile. ParcMate user can extend their time on the meter remotely from any location via the ParcMate application. Meter monitoring individuals/agencies will receive information on currently occupied and recently expired parking stays at meters for meter payment enforcement.

For all parking lot/garage configurations (attended facilities, gated facilities, open lots) and on- or off-street metered parking, ParcMate can notify the user of an upcoming parking duration expiration, at a set number of minutes prior to that expiration as designated by the user via a setting in their profile or determined for that specific stay. If the parking stay required prepayment, the user can extend their parking duration via their ParcMate application on their smartphone, for a specific amount of time, based on stored parking rate information, rules and calculations in the ParcMate system for the specific location, date and time.

Other GarageMate and GarageMate Pro features described previously can be made available for self-park facilities with gated or attendant controlled entry/exit, and parking entities controlling meter parking, on- or off-street.

One or more embodiments of the present invention have been described. Nevertheless, it will be understood that various modifications may be made without departing from the spirit and scope of the invention. Accordingly, other embodiments are within the scope of the following claims.

The invention claimed is:

1. A parking management system, comprising:
   a database in communication with a digital communication network, the database configured to receive and store occupancy data associated with a plurality of parking sectors being associated with a plurality of parking garages having a different global positioning identifier from each other;
   a digital computer system in data communications with the database, the digital computer system being configured to dynamically track an occupancy level of each of said parking sectors based on the occupancy data and an anticipated departure time of vehicles occupying said parking spaces;
   said digital computer system being configured to receive a data request representative of an arrival time and occupancy parking duration from a mobile device of a user based on a dynamic global position location of the mobile device, to receive data representative of the dynamic global position location and responsive to the data request, the digital computer system being configured to determine available parking sectors within a predetermined geographic radius based on the dynamic global position location of the mobile device, including the global positioning identifiers of the parking garages, and direct vehicles to a particular parking sector based on said anticipated departure time, including the predetermined geographic radius; and
   wherein the digital computer system is configured to execute a computer curation sequence:
   to curate the particular parking sector for the vehicle based on assigning at least two parking garages each having tied closest distances using the dynamic global position location of the mobile device, for calculating a closest distance garage subgroup; and for enabling selection of the particular parking sector within the closest distance garage subgroup based on a lowest estimated parking cost derived from the parking rate data; and
   to curate the particular parking sector for the vehicle based on assigning at least two parking garages each having tied lowest estimated parking cost derived from the parking rate data for calculating a lowest cost garage subgroup and for enabling selection of the particular parking sector within the lowest cost garage subgroup based on a garage closest distance using the dynamic global position location of the mobile device.

2. The parking management system of claim 1, wherein the digital computer system is configured to transmit data from a detector, the detector being configured to identify vehicles entering or leaving a parking garage associated with a selected parking sector.

3. The parking garage management system of claim 2, wherein the detector is a beacon device configured to transmit a data packet to the mobile device of the user, the data packet including the global positioning identifier of the parking garage proximate to the mobile device, the digital computer system being further configured to transmit a data prompt, via the beacon device, to the mobile device to initiate a check-in sequence.

4. The parking management system of claim 3, wherein the digital computer system is configured to capture and store an identifier for the identified vehicle and transmit the identifier to the database and the database including a plurality of records of stored vehicle information.

5. The parking management system of claim 4, wherein the digital computer system is configured, upon initiation of the check-in sequence, stored vehicle information associated with the identified vehicle is retrieved and transmitted to a network server.

6. The parking management system of claim 2, wherein the digital computer system is further configured to estimate a cost of stay for the identified vehicle, the estimate based on consideration of multiple parking rates and rate rules including an applicable coupon rate or rule for the identified vehicle, based on an at least one of an estimated parking arrival time, departure time, car type, and demand-based rate rule of a garage and communicate the lowest applicable rate for the vehicle.

7. The parking management system of claim 6, wherein while the vehicle is parked in the garage, the digital computer system is configured to transmit to the mobile device of the user, in real-time, a current cost of parking and upcoming rate changes for an estimated vehicle parking time, and further transmits the lowest applicable rate for the estimated vehicle parking time.

8. A parking management system, comprising:
   a database in communication with a digital communication network, the database configured to receive and store occupancy data associated with a plurality of parking sectors being associated with a plurality of parking garages having a different global positioning identifier from each other;
   a digital computer system in data communications with the database, the digital computer system being configured to dynamically track an occupancy level of each of said parking sectors based on the occupancy data and an anticipated departure time of vehicles occupying said parking spaces;
   said digital computer system being configured to receive a data request representative of an arrival time and occupancy parking duration from a mobile device of a user based on a dynamic global position location of the mobile device, to receive data representative of the dynamic global position location and responsive to the data request, the digital computer system being configured to determine available parking sectors within a predetermined geographic radius based on the dynamic global position location of the mobile device, including the global positioning identifiers of the parking garages, and
   direct vehicles to a particular parking sector based on said anticipated departure time, including the predetermined geographic radius; and
   wherein the digital computer system is configured to execute a computer curation sequence:
   to curate the particular parking sector for the vehicle based on assigning at least two parking garages each having tied closest distances using the dynamic global position location of the mobile device, for calculating a closest distance garage subgroup; and for enabling selection of the particular parking sector within the closest distance garage subgroup based on a lowest estimated parking cost derived from the parking rate data.

9. The parking management system of claim 8, wherein the digital computer system is configured to transmit data from a detector, the detector being configured to identify vehicles entering or leaving a parking garage associated with a selected parking sector.

10. The parking management system of claim 9, wherein the detector is a beacon device configured to transmit a data packet to the mobile device of the user, the data packet including the global positioning identifier of the parking garage proximate to the mobile device, the digital computer system being further configured to transmit a data prompt, via the beacon device, to the mobile device to initiate a check-in sequence.

11. The parking management system of claim 10, wherein the digital computer system is configured to capture and store an identifier for the identified vehicle and transmit the identifier to the database and the database including a plurality of records of stored vehicle information.

12. The parking management system of claim 11, wherein the digital computer system is configured, upon initiation of the check-in sequence, stored vehicle information associated with the identified vehicle is retrieved and transmitted to a network server.

13. The parking management system of claim 9, wherein the digital computer system is further configured to estimate a cost of stay for the identified vehicle, the estimate based on consideration of multiple parking rates and rate rules including an applicable coupon rate or rule for the identified vehicle, based on an at least one of an estimated parking arrival time, departure time, car type, and demand-based rate rule of a garage and communicate the lowest applicable rate for the vehicle.

14. The parking management system of claim 11, wherein while the vehicle is parked in the garage, the digital computer system is configured to transmit to the mobile device of the user, in real-time, a current cost of parking and upcoming rate changes for an estimated vehicle parking time, and further transmits the lowest applicable rate for the estimated vehicle parking time.

15. A parking management system, comprising:
a database in communication with a digital communication network, the database configured to receive and store occupancy data associated with a plurality of parking sectors being associated with a plurality of parking garages having a different global positioning identifier from each other;
a digital computer system in data communications with the database, the digital computer system being configured to dynamically track an occupancy level of each of said parking sectors based on the occupancy data and an anticipated departure time of vehicles occupying said parking spaces;
said digital computer system being configured to receive a data request representative of an arrival time and occupancy parking duration from a mobile device of a user based on a dynamic global position location of the mobile device, to receive data representative of the dynamic global position location and responsive to the data request, the digital computer system being configured to determine available parking sectors within a predetermined geographic radius based on the dynamic global position location of the mobile device, including the global positioning identifiers of the parking garages, and direct vehicles to a particular parking sector based on said anticipated departure time, including the predetermined geographic radius; and
wherein the digital computer system is configured to execute a computer curation sequence:
to curate the particular parking sector for the vehicle based on assigning at least two parking garages each having tied lowest estimated parking cost derived from the parking rate data for calculating a lowest cost garage subgroup and for enabling selection of the particular parking sector within the lowest cost garage subgroup based on a garage closest distance using the dynamic global position location of the mobile device.

16. The parking management system of claim 15, wherein the digital computer system is configured to transmit data from a detector, the detector being configured to identify vehicles entering or leaving a parking garage associated with a selected parking sector.

17. The parking management system of claim 16, wherein the detector is a beacon device configured to transmit a data packet to the mobile device of the user, the data packet including the global positioning identifier of the parking garage proximate to the mobile device, the digital computer system being further configured to transmit a data prompt, via the beacon device, to the mobile device to initiate a check-in sequence.

18. The parking management system of claim 17, wherein the digital computer system is configured to capture and store an identifier for the identified vehicle and transmit the identifier to the database and the database including a plurality of records of stored vehicle information.

19. The parking management system of claim 16, wherein the digital computer system is configured, upon initiation of the check-in sequence, stored vehicle information associated with the identified vehicle is retrieved and transmitted to a network server.

20. The parking management system of claim 16, wherein the digital computer system is further configured to estimate a cost of stay for the identified vehicle, the estimate based on consideration of multiple parking rates and rate rules including an applicable coupon rate or rule for the identified vehicle, based on an at least one of an estimated parking arrival time, departure time, car type, and demand-based rate rule of a garage and communicate the lowest applicable rate for the vehicle.

* * * * *